US011617206B2

(12) United States Patent
Lin

(10) Patent No.: US 11,617,206 B2
(45) Date of Patent: Mar. 28, 2023

(54) METHOD AND APPARATUS FOR CHANNEL ACCESS SWITCH IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/580,043

(22) Filed: Jan. 20, 2022

(65) Prior Publication Data

US 2022/0240313 A1   Jul. 28, 2022

Related U.S. Application Data

(60) Provisional application No. 63/139,538, filed on Jan. 20, 2021, provisional application No. 63/139,522, filed on Jan. 20, 2021.

(51) Int. Cl.
*H04W 4/00* (2018.01)
*H04W 74/08* (2009.01)
*H04L 5/00* (2006.01)

(52) U.S. Cl.
CPC ....... *H04W 74/0808* (2013.01); *H04L 5/0048* (2013.01)

(58) Field of Classification Search
CPC .......................... H04W 74/0808; H04L 5/0048
See application file for complete search history.

(56) References Cited

U.S. PATENT DOCUMENTS

| | | | | |
|---|---|---|---|---|
| 2016/0149681 | A1* | 5/2016 | Vajapeyam | H04L 5/0048 370/252 |
| 2016/0227519 | A1* | 8/2016 | Nimbalker | H04W 72/042 |
| 2016/0352482 | A1* | 12/2016 | Sun | H04W 72/042 |
| 2018/0241588 | A1* | 8/2018 | Harada | H04L 5/005 |
| 2018/0310193 | A1* | 10/2018 | Bhorkar | H04B 7/0626 |
| 2020/0359411 | A1* | 11/2020 | Li | H04W 72/1273 |
| 2021/0315011 | A1* | 10/2021 | Zhou | H04W 74/0816 |

OTHER PUBLICATIONS

Extended European Search Report to the counterpart European Patent Application rendered by the European Patent Office dated Jun. 21, 2022, 12 pages.

(Continued)

*Primary Examiner* — Siren Wei
(74) *Attorney, Agent, or Firm* — Skaar Ulbrich Macari, P.A.

(57) ABSTRACT

Methods and apparatuses are provided for channel access switching in a wireless communication system, with or without Listen-Before-Talk (LBT), and/or with different types of efficiently operated LBT. A device, including a User Equipment (UE) or a base station, can determine whether and/or how to perform LBT for a transmission based on a property of the transmission. The property could be a resource allocation for the transmission. The property could be a way to allocate resources for the transmission. The property could be a length or size of resource allocated for the transmission. The property could be an amount of resources allocated for the transmission. The resource allocation could be a time domain resource allocation and/or a frequency domain resource allocation.

17 Claims, 15 Drawing Sheets

(56) References Cited

OTHER PUBLICATIONS

Qualcomm Incorporated: "DL signals and channels for NR-U", 3GPP Draft; R1-1912936; retrieved from the Internet on Nov. 9, 2019: URL:https://ftp.3gpp.org/tsg_ran/WG1_RL1/TSGR1_99/Docs/R1-1912936.zip; 16 pages.
Sony: "Beam management enhancement for NR 1-14 from 52.6GHz to 71GHz", 3GPP Draft: R1-2100852; retrieved from the Internet on Jan. 19, 2021: URL:https://ftp.3gpp.org/tsg_ran/WG1_RL1/TSGR1_104-e/Docs/R1-2100852.zip; 4 pages.
Spreadtrum Communications: "Remaining issues on initial access signals/channels", 3GPP Draft; R1-2000418; retrieved from the Internet on Feb. 15, 2020: URL:https://ftp.3gpp.org/tsg_ran/WG1_RL1/TSGR1_100_e/Docs/R1-2000418.zip; 10 pages.
Huawei et al.: "DL channels and signals in NR unlicensed band", 3GPP Draft; R1-1910043; retrieved from the Internet on Oct. 8, 2019: URL:http://www.3gpp.org/ftp/tsg_ran/WG1_RL1/TSGR1_98b/Docs/R1-1910043.zip; 17 pages.
Alcatel-Lucent et al.: "CSI Measurement and Reporting for LAA", 3GPP Draft: R1-157018; retrieved from the Internet on Nov. 15, 2015: URL:http://www.3gpp.org/ftp/Meetings_3GPP_SYNC/RAN1/Docs/; 5 pages.
Motorola Mobility et al.: "Feature lead summary #3 for NR-U DL Signals and Channels", 3GPP Draft; R1-1913501; retrieved from the Internet on Nov. 25, 2019: URL:https://ftp.3gpp.org/tsg_ran/WG1_RL1/TSGR1_99/Docs/R1-1913501.zip; 36 pages.

\* cited by examiner

METHOD AND APPARATUS FOR CHANNEL ACCESS SWITCH IN A WIRELESS COMMUNICATION SYSTEM

CROSS-REFERENCE TO RELATED APPLICATIONS

The present application claims priority to and the benefit of U.S. Provisional Patent Application Ser. Nos. 63/139,522, filed Jan. 20, 2021, and 63/139,538, filed Jan. 20, 2021; with the entire disclosure of each referenced application fully incorporated herein by reference.

FIELD

This disclosure generally relates to wireless communication networks and, more particularly, to a method and apparatus for channel access switching in a wireless communication system with or without Listen-Before-Talk (LBT), and/or with different types of efficiently operated LBT.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses are provided for channel access switching in a wireless communication system with or without Listen-Before-Talk (LBT), and/or with different types of efficiently operated LBT. A device can determine whether and/or how to perform LBT for a transmission based on a property of the transmission. The property could be a resource allocation for the transmission. The property could be a way to allocate resources for the transmission. The property could be a length or size of resources allocated for the transmission. The property could be an amount of resources allocated for the transmission. The resource allocation could be a time domain resource allocation and/or a frequency domain resource allocation.

In various embodiments, a device determines whether to perform LBT for a transmission, or not, based on a resource allocation of the transmission. The device can determine whether to perform LBT for a transmission, or not, based on amount of the resource allocated for the transmission. The device can perform LBT for a transmission if/when the resource allocated for the transmission is more than a threshold. The device may not perform LBT for a transmission if/when the resource allocated for the transmission is less than a threshold. The device can be a User Equipment (UE) or a base station.

Various embodiments provide a method for a base station operating in a shared spectrum, comprising transmitting Channel State Information Reference Signal (CSI-RS) on a first resource on a channel after sensing the channel, wherein the first resource is indicated by Downlink Control Information (DCI), and transmitting CSI-RS on a second resource on the channel without sensing the channel, wherein the second resource is indicated by a Radio Resource Control (RRC) configuration.

Various embodiments provide a method for a base station operating in a shared spectrum, comprising performing LBT for CSI-RS transmission on a first resource, wherein the first resource is indicated by DCI, and not performing LBT for CSI-RS on a second resource, wherein the second resource is indicated by a RRC configuration.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.211 V15.7.0, "NR physical channels and modulation"; [2] Draft 3GPP TS 37.213 V16.4.0, "NR Physical layer procedures for shared spectrum channel access"; [3] RP-202925, "Revised WID: Extending current NR operation to 71 GHz"; and [4] 3GPP TS 38.214 V16.4.0, "NR Physical layer procedures for data". The standards and documents listed above are hereby expressly and fully incorporated herein by reference in their entirety.

Figure 1:
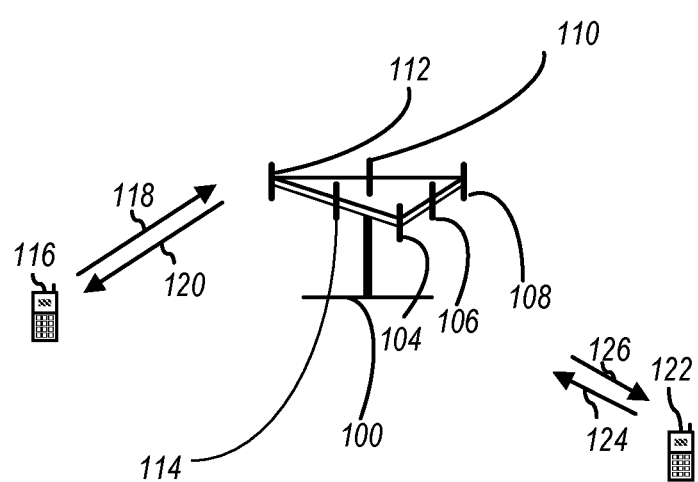
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
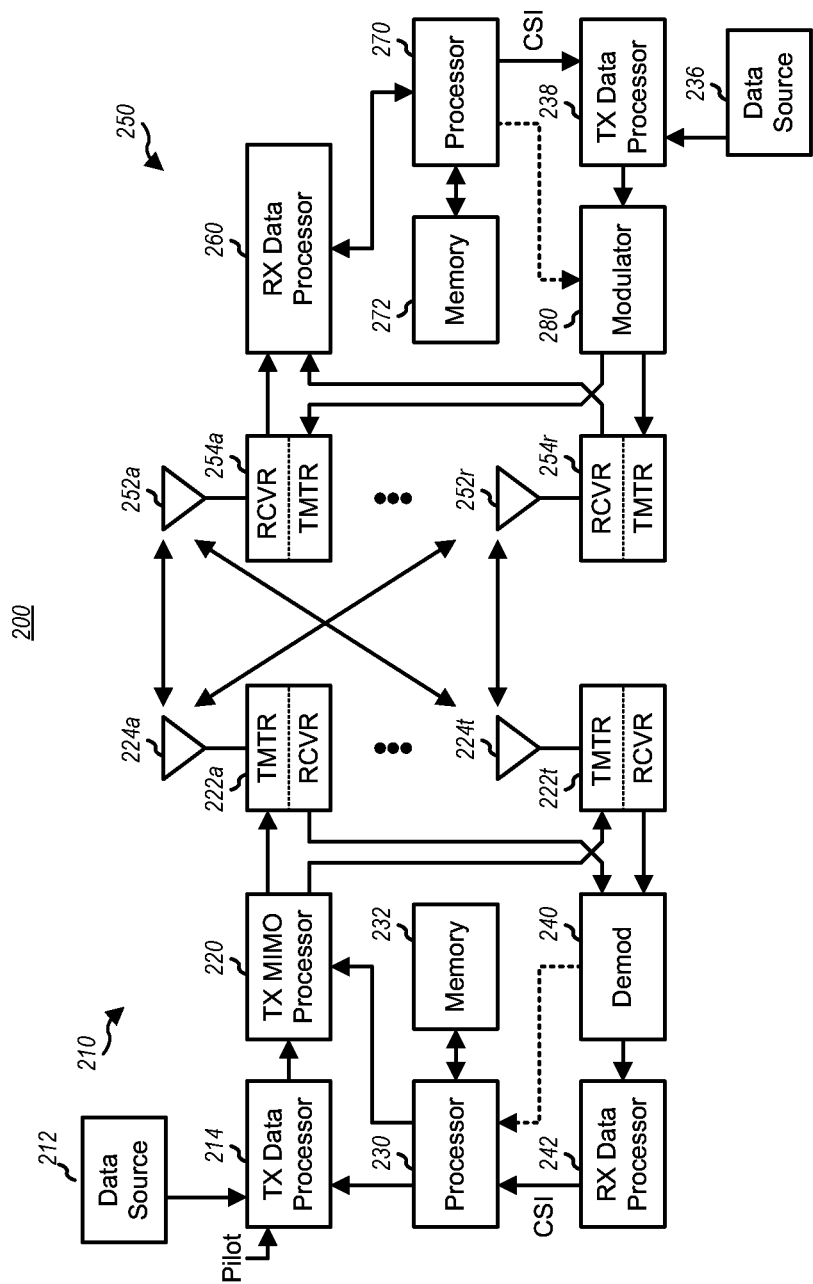
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
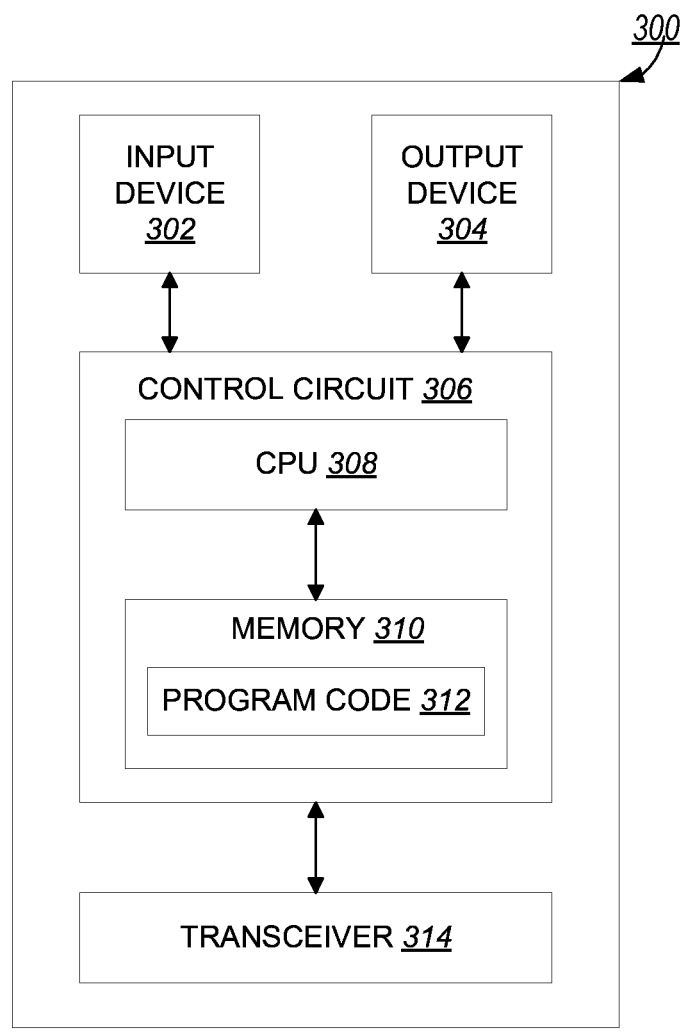
FIG. 3 is a functional block diagram of a communication system, in accordance with embodiments of the present invention.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes. Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
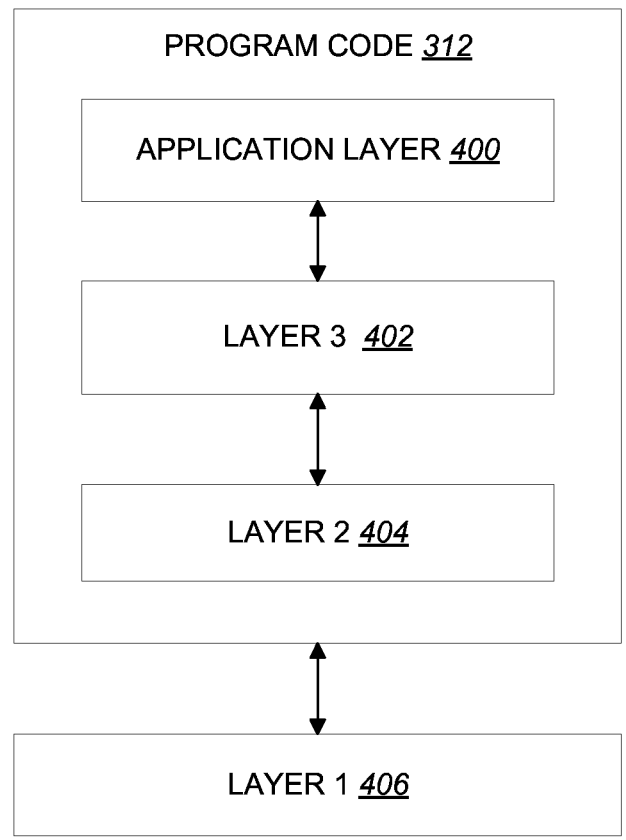
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

Frame structure used in New RAT (NR) for 5G, to accommodate various types of requirements (e.g., [1] TS 38.211 V15.7.0) for time and frequency resource, e.g., from ultra-low latency (~0.5 ms) to delay-tolerant traffic for MTC, from high peak rate for eMBB to very low data rate for MTC. An important focus of this study is the low latency aspect, e.g., short TTI, while other aspects of mixing/adapting different TTIs can also be considered in the study. In addition to diverse services and requirements, forward compatibility is an important consideration in initial NR frame structure design as not all features of NR would be included in the beginning phase/release.

Reducing latency of protocol is an important improvement between different generations/releases, which can improve efficiency as well as meeting new application requirements, e.g., real-time service. An effective method frequently adopted to reduce latency is to reduce the length of TTIs, from 10 ms in 3G to 1 ms in LTE.

When it comes to NR, the story becomes somehow different, as backward compatibility is not a must. Numerology can be adjusted so that reducing symbol number of a TTI would not be the only tool to change TTI length. Using LTE numerology as an example, it comprises 14 OFDM symbol in 1 ms and a subcarrier spacing of 15 KHz. When the subcarrier spacing goes to 30 KHz, under the assumption of the same FFT size and the same CP structure, there would be 28 OFDM symbols in 1 ms, equivalently the TTI become 0.5 ms if the number of OFDM symbols in a TTI is kept the same. This implies the design between different TTI lengths can be kept common, with good scalability performed on the subcarrier spacing. Of course there would always be trade-off for the subcarrier spacing selection, e.g., FFT size, definition/number of PRB, the design of CP, supportable system bandwidth, . . . While as NR considers larger system bandwidth, and larger coherence bandwidth, inclusion of a larger sub carrier spacing is a natural choice.

More details of NR frame structure, channel and numerology design is given below from [1] 3GPP TS 38.211 V15.7.0:

Quotation Start

4 Frame Structure and Physical Resources 4.1 General

Throughout this specification, unless otherwise noted, the size of various fields in the time domain is expressed in time units $T_c = 1/(\Delta f_{max} \cdot N_f)$ where $\Delta f_{max} = 480 \cdot 10^3$ Hz and $N_f=4096$. The constant $\kappa=T_s/T_c=64$ where $T_s(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where pt and the cyclic prefix for a bandwidth part are obtained from the higher-layer parameter subcarrierSpacing and cyclicPrefix, respectively.

TABLE 4.2-1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure

4.3.1 Frames and Subframes

Downlink and uplink transmissions are organized into frames with $T_f=(\Delta f_r N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

Figure 5:
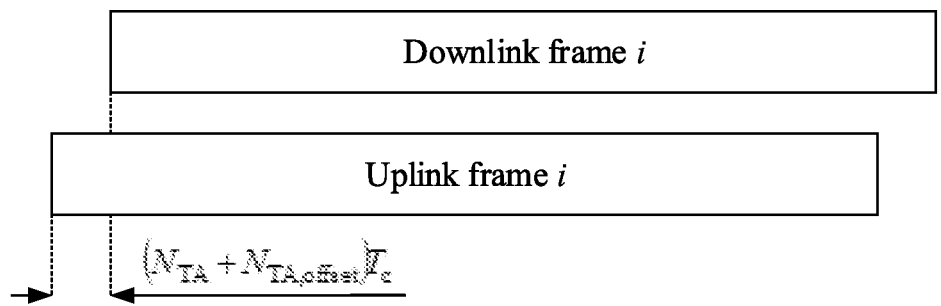
FIG. 5 is a reproduction of FIG. 4.3.1-1 of TS 38.211 V15.7.0: Uplink-downlink timing relation.

FIG. 5 is a reproduction of FIG. 4.3.1-1 of TS 38.211 V15.7.0: Uplink-downlink timing relation.

4.3.2 Slots

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by paremeter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$), is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx}T_c$ after the end of the last transmitted uplink symbol in the same or different cell within the group of cells where $N_{Tx-Rx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

TABLE 4.3.2-1

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| μ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

4.4 Physical Resources

4.4.5 Bandwidth Part

A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in bandwith part shall fulfil $N_{grid,x}^{start,\mu} \leq N_{BWP,i}^{start,\mu} < N_{grid,x}^{start,\mu}+N_{grid,x}^{start,\mu}$ and $N_{grid,x}^{start,\mu} < N_{BWP,i}^{start,\mu}+N_{BWP,i}^{size,\mu} \leq N_{grid,x}^{start,\mu}+N_{grid,x}^{size,\mu}$ respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index $\mu$ may be dropped from $N_{BWP,i}^{start,\mu}$, $N_{BWP,i}^{size,\mu}$, $N_{grid,x}^{start,\mu}$, and $N_{grid,x}^{size,\mu}$.

4.5 Carrier aggregation

Transmissions in multiple cells can be aggregated. Unless otherwise noted, the description in this specification applies to each of the serving cells.

Quotation End

When accessing an unlicensed spectrum, e.g. a shared spectrum, some mechanism to determine whether a device, e.g. a UE or a base station/access node, could access the spectrum (e.g. perform a transmission) may be required to ensures fairness for all devices on the spectrum. For example, a device could detect/receive signal on the spectrum/serving cell to judge whether the spectrum is available for utilization. When a device detects nothing or silence, e.g. for certain period, the device could consider the spectrum available and perform transmission. On the other hand, when a device detects some signal, e.g. with certain strength from other device, on the spectrum, the device could consider the spectrum currently occupied and hold off its transmission. This kind of mechanism is known as listen before talk (LBT). There could be some more details regarding how LBT is done, such as a threshold for device to judge whether the channel is currently occupied or not (e.g. a device could consider a too weak signal as silence), how long the device perform detection and/or how to proceed the following when a device fails a trial of LBT, e.g. when and/or how to perform another trial of detection. More details of channel accessing scheme could be found in the following from [2] Draft 3GPP TS 37.213 V16.4.0:

Quotation Start

4 Channel Access Procedure 4.0 General

Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl}$=9 us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst can be any of the following:

Transmission(s) initiated by an eNB that includes a primary synchronization signal (PSS), secondary synchronization signal (SSS) and cell-specific reference signal(s)(CRS) and may include non-zero power CSI reference signals (CSI-RS).

Transmission(s) initiated by a gNB that includes at least an SS/PBCH block consisting of a primary synchronization signal (PSS), secondary synchronization signal (SSS), physical broadcast channel (PBCH) with associated demodulation reference signal (DM-RS) and may also include CORESET for PDCCH scheduling PDSCH with SIB1, and PDSCH carrying SIB1 and/or non-zero power CSI reference signals (CSI-RS).

4.1 Downlink Channel Access Procedures

An eNB operating LAA Scell(s) on channel(s) and a gNB performing transmission(s) on channel(s) shall perform the channel access procedures described in this clause for accessing the channel(s) on which the transmission(s) are performed.

In this clause, $X_{Thresh}$ for sensing is adjusted as described in clause 4.1.5 when applicable.

A gNB performs channel access procedures in this clause unless the higher layer parameter ChannelAccessMode-r16 is provided and ChannelAccessMode-r16='semistatic'.

4.1.1 Type 1 DL Channel Access Procedures

This clause describes channel access procedures to be performed by an eNB/gNB where the time duration spanned by the sensing slots that are sensed to be idle before a downlink transmission(s) is random. The clause is applicable to the following transmissions:

Transmission(s) initiated by an eNB including PDSCH/PDCCH/EPDCCH, or

Transmission(s) initiated by a gNB including unicast PDSCH with user plane data, or unicast PDSCH with user plane data and unicast PDCCH scheduling user plane data, or Transmission(s) initiated by a gNB with only discovery burst or with discovery burst multiplexed with non-unicast information, where the transmission(s) duration is larger than 1 ms or the transmission causes the discovery burst duty cycle to exceed 1/20.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N=N_{init}$, where $N_{init}$ is a random number uniformly distributed between 0 and $CW_p$, and go to step 4;
2) if N>0 and the eNB/gNB chooses to decrement the counter, set N=N 1;
3) sense the channel for an additional sensing slot duration, and if the additional sensing slot duration is idle, go to step 4; else, go to step 5;
4) if N=0, stop; else, go to step 2.
5) sense the channel until either a busy sensing slot is detected within an additional defer duration $T_d$ or all the sensing slots of the additional defer duration $T_d$ are detected to be idle;
6) if the channel is sensed to be idle during all the sensing slot durations of the additional defer duration $T_d$, go to step 4; else, go to step 5;

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f=16$ us immediately followed by $m_p$ consecutive sensing slot durations $T_{sl}$, and $T_f$ includes an idle sensing slot duration $T_{sl}$ at start of $T_f$.

$CW_{min,p} \leq CW_p \leq CW_{max,p}$ is the contention window. $CW_p$ adjustment is described in clause 4.1.4.

$CW_{min,p}$ and $CW_{max,p}$ are chosen before step 1 of the procedure above.

$m_p$, $CW_{min,p}$, and $CW_{max,p}$ are based on a channel access priority class p associated with the eNB/gNB transmission, as shown in Table 4.1.1-1.

An eNB/gNB shall not transmit on a channel for a Channel Occupancy Time that exceeds $T_{m, cot, p}$ where the channel access procedures are performed based on a channel access priority class p associated with the eNB/gNB transmissions, as given in Table 4.1.1-1.

If an eNB/gNB transmits discovery burst(s) as described in clause 4.1.2 when N>0 in the procedure above, the eNB/gNB shall not decrement N during the sensing slot duration(s) overlapping with discovery burst(s).

A gNB may use any channel access priority class for performing the procedures above to transmit transmission(s) including discovery burst(s) satisfying the conditions described in this clause.

A gNB shall use a channel access priority class applicable to the unicast user plane data multiplexed in PDSCH for performing the procedures above to transmit transmission(s) including unicast PDSCH with user plane data.

For p=3 and =4, if the absence of any other technology sharing the channel can be guaranteed on a long term basis (e.g. by level of regulation), $T_{m\ cot,p}=10$ ms, otherwise, $T_{m\ cot,p}=8$ ms.

TABLE 4.1.1-1

Channel Access Priority Class (CAPC)

| Channel Access Priority Class (p) | $m_p$ | $CW_{min, p}$ | $CW_{max, p}$ | $T_{m\ cot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

4.1.1.1 Regional Limitations on Channel Occupancy Time

In Japan, if an eNB/gNB has transmitted a transmission after N=0 in step 4 of the procedure above, the eNB/gNB may transmit the next continuous transmission, for duration of maximum $T_j=4$ ms, immediately after sensing the channel to be idle for at least a sensing interval of $T_{js}=34$ us and if the total sensing and transmission time is not more than $$1000 \cdot T_{mcot} + \left\lceil \frac{T_{mcot}}{T_j} - 1 \right\rceil \cdot T_{js}$$

US. The sensing interval $T_{js}$ consists of duration $T_f=16$ us immediately followed by two sensing slots and $T_f$ includes an idle sensing slot at start of $T_f$. The channel is considered to be idle for $T_{js}$ if it is sensed to be idle during the sensing slot durations of $T_{js}$.

4.1.2 Type 2 DL Channel Access Procedures

This clause describes channel access procedures to be performed by an eNB/gNB where the time duration spanned by sensing slots that are sensed to be idle before a downlink transmission(s) is deterministic.

If an eNB performs Type 2 DL channel access procedures, it follows the procedures described in clause 4.1.2.1.

Type 2A channel access procedures as described in clause 4.1.2.1 are applicable to the following transmission(s) performed by an eNB/gNB:

Transmission(s) initiated by an eNB including discovery burst and not including PDSCH where the transmission(s) duration is at most 1 ms, or Transmission(s) initiated by a gNB with only discovery burst or with discovery burst multiplexed with non-unicast information, where the transmission(s) duration is at most 1 ms, and the discovery burst duty cycle is at most 1/20, or Transmission(s) by an eNB/gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

4.1.2.1 Type 2A DL Channel Access Procedures

An eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

4.1.2.2 Type 2B DL Channel Access Procedures

A gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

4.1.2.3 Type 2C DL Channel Access Procedures

When a gNB follows the procedures in this clause for transmission of a DL transmission, the gNB does not sense the channel before transmission of the DL transmission. The duration of the corresponding DL transmission is at most 584 us.

4.1.4 Contention Window Adjustment Procedures

If an eNB/gNB transmits transmissions including PDSCH that are associated with channel access priority class p on a channel, the eNB/gNB maintains the contention window value $CW_p$ and adjusts $CW_p$ before step 1 of the procedure described in clause 4.1.1 for those transmissions as described in this clause.

4.1.4.2 Contention Window Adjustment Procedures for DL Transmissions by gNB

If a gNB transmits transmissions including PDSCH that are associated with channel access priority class p on a channel, the gNB maintains the contention window value $CW_p$ and adjusts $CW_p$ before step 1 of the procedure described in clause 4.1.1 for those transmissions using the following steps:

1) For every priority class $p\in\{1,2,3,4\}$, set $CW_p=CW_{min,p}$.
2) If HARQ-ACK feedback is available after the last update of $W_p$, go to step 3. Otherwise, if the gNB transmission after procedure described in clause 4.1.1 does not include a retransmission or is transmitted within a duration $T_w$ from the end of the reference duration corresponding to the earliest DL channel occupancy after the last update of $CW_p$, go to step 5; otherwise go to step 4.
3) The HARQ-ACK feedback(s) corresponding to PDSCH(s) in the reference duration for the latest DL channel occupancy for which HARQ-ACK feedback is available is used as follows:
   a. If at least one HARQ-ACK feedback is 'ACK' for PDSCH(s) with transport block based feedback or at least 10% of HARQ-ACK feedbacks is 'ACK' for PDSCH CBGs transmitted at least partially on the channel with code block group based feedback, go to step 1; otherwise go to step 4.
4) Increase $CW_p$ for every priority class $p\in\{1,2,3,4\}$ to the next higher allowed value.
5) For every priority class $p\in\{1,2,3,4\}$, maintain $CW_p$ as it is; go to step 2.

The reference duration and duration $T_w$ in the procedure above are defined as follows:

The reference duration corresponding to a channel occupancy initiated by the gNB including transmission of PDSCH(s) is defined in this clause as a duration starting from the beginning of the channel occupancy until the end of the first slot where at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst by the gNB within the channel occupancy that contains unicast PDSCH(s) is the reference duration for CWS adjustment.

$T_w=\max(T_A, T_B+1\text{ MS})$ where $T_B$ is the duration of the transmission burst from start of the reference duration in MS and $T_A=5$ ms if the absence of any other technology sharing the channel can not be guaranteed on a long-term basis (e.g. by level of regulation), and $T_A=10$ ms otherwise.

If a gNB transmits transmissions using Type 1 channel access procedures associated with the channel access priority class p on a channel and the transmissions are not associated with explicit HARQ-ACK feedbacks by the corresponding UE(s), the gNB adjusts $CW_p$ before step 1 in the procedures described in subclase 4.1.1, using the latest $CW_p$ used for any DL transmissions on the channel using Type 1 channel access procedures associated with the channel access priority class p. If the corresponding channel access priority class p has not been used for any DL transmissions on the channel, $CW_p=CW_{min,p}$ is used.

4.1.4.3 Common Procedures for CWS Adjustments for DL Transmissions

The following applies to the procedures described in clauses 4.1.4.1 and 4.1.4.2:

If $CW_p=CW_{max,p}$ the next higher allowed value for adjusting $CW_p$ is $CW_{max,p}$ If the $CW_p=CW_{max,p}$ is consecutively used K times for generation of $N_{init}$, $CW_p$ is reset to $CW_{min,p}$ only for that priority class p p for which $CW_p=CW_{max,p}$ is consecutively used K times for generation of $N_{init}$. K is selected by eNB/gNB from the set of values {1, 2, ... ,8} for each priority class p∈{1,2,3,4}.

4.1.5 Energy Detection Threshold Adaptation Procedures

An eNB/gNB accessing a channel on which transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the absence of any other technology sharing the channel can be guaranteed on a long-term basis (e.g. by level of regulation) then:

$$X_{Thresh\_max} = \min\left\{\begin{array}{l} T_{max} + 10dB, \\ X_r \end{array}\right\}$$

$X_r$ is maximum energy detection threshold defined by regulatory requirements in dBm when such requirements are defined, otherwise $X_r = T_{max} + 10$ dB;

otherwise, $$X_{Thresh\_max} = \max\left\{\begin{array}{l} -72 + 10 \cdot \log10(BW\text{MHz}/20\text{MHz}) \text{ dBm}, \\ \min\left\{\begin{array}{l} T_{max}, \\ T_{max} - T_A + (P_H + 10 \cdot \log10(BW\text{MHz}/20\text{MHz}) - P_{TX}) \end{array}\right\} \end{array}\right\}$$

where:

$T_A = 5$ dB for transmissions including discovery burst(s) as described in clause 4.1.2, and $T_A = 10$ dB otherwise;

$P_H = 23$ dBm;

$P_{TX}$ is the set maximum eNB/gNB output power in dBm for the channel;

eNB/gNB uses the set maximum transmission power over a single channel irrespective of whether single channel or multi-channel transmission is employed $T_{max}$ (dBm)=10·log 10 (3.16228·10$^{-8}$(mW/MHz)· BWMHz (MHz));

BWMHz is the single channel bandwidth in MHz.

4.2 Uplink Channel Access Procedures

A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures described in this clause for the UE to access the channel(s) on which the transmission(s) are performed.

In this clause, transmissions from a UE are considered as separate UL transmissions, irrespective of having a gap between transmissions or not, and $X_{Thresh}$ for sensing is adjusted as described in clause 4.2.3 when applicable.

A UE performs channel access procedures in this clause unless the higher layer parameter ChannelAccessMode-r16 is provided and ChannelAccessMode-r16=' semistatic'.

If a UE fails to access the channel(s) prior to an intended UL transmission to a gNB, Layer 1 notifies higher layers about the channel access failure.

4.2.1 Channel Access Procedures for Uplink Transmission(s)

A UE can access a channel on which UL transmission(s) are performed according to one of Type 1 or Type 2 UL channel access procedures. Type 1 channel access procedure is described in clause 4.2.1.1. Type 2 channel access procedure is described in clause 4.2.1.2.

If a UL grant scheduling a PUSCH transmission indicates Type 1 channel access procedures, the UE shall use Type 1 channel access procedures for transmitting transmissions including the PUSCH transmission unless stated otherwise in this clause.

A UE shall use Type 1 channel access procedures for transmitting transmissions including the autonomous or configured grant PUSCH transmission on configured UL resources unless stated otherwise in this clause.

If a UL grant scheduling a PUSCH transmission indicates Type 2 channel access procedures, the UE shall use Type 2 channel access procedures for transmitting transmissions including the PUSCH transmission unless stated otherwise in this clause.

A UE shall use Type 1 channel access procedures for transmitting SRS transmissions not including a PUSCH transmission. UL channel access priority class p=1 in Table 4.2.1-1 is used for SRS transmissions not including a PUSCH.

If a DL assignment triggering SRS but not scheduling a PUCCH transmission indicates Type 2 channel access procedures, the UE shall use Type 2 channel access procedures.

If a UE is scheduled by an eNB/gNB to transmit PUSCH and SRS in contiguous transmissions without any gaps in between, and if the UE cannot access the channel for PUSCH transmission, the UE shall attempt to make SRS transmission according to uplink channel access procedures specified for SRS transmission.

If a UE is scheduled by a gNB to transmit PUSCH and one or more SRSs by a single UL grant in non-contiguous transmissions, or a UE is scheduled by a gNB to transmit PUCCH and/or SRSs by a single DL assignment in non-contiguous transmissions, the UE shall use the channel access procedure indicated by the scheduling DCI for the first UL transmission scheduled by the scheduling DCI. If the channel is sensed by the UE to be continuously idle after the UE has stopped transmitting the first transmission, the UE may transmit further UL transmissions scheduled by the scheduling DCI using Type 2 channel access procedures or Type 2A UL channel access procedures without applying a CP extension if the further UL transmissions are within the gNB Channel Occupancy Time. Otherwise, if the channel sensed by the UE is not continuously idle after the UE has stopped transmitting the first UL transmission or the further UL transmissions are outside the gNB Channel Occupancy Time, the UE may transmit the further UL transmissions using Type 1 channel access procedure, without applying a CP extension.

A UE shall use Type 1 channel access procedures for PUCCH transmissions unless stated otherwise in this clause. If a DL grant determined according to Clause 9.2.3 in [7, TS38.213] or a random access response (RAR) message for successRAR scheduling a PUCCH transmission indicates Type 2 channel access procedures, the UE shall use Type 2 channel access procedures.

When a UE uses Type 1 channel access procedures for PUCCH transmissions or PUSCH only transmissions without UL-SCH, the UE shall use UL channel access priority class p=1 in Table 4.2.1-1.

A UE shall use Type 1 channel access procedure for PRACH transmissions and PUSCH transmissions without user plane data related to random access procedure that initiate a channel occupancy. In this case, UL channel access priority class p=1 in Table 4.2.1-1 is used for PRACH transmissions, and UL channel access priority class used for PUSCH transmissions is determined according to Clause 5.6.2 in [9].

When a UE uses Type 1 channel access procedures for PUSCH transmissions on configured resource, the UE determines the corresponding UL channel access priority p in Table 4.2.1-1 following the procedures described in Clause 5.6.2 in [9].

When a UE uses Type 1 channel access procedures for PUSCH transmissions with user plane data indicated by a UL grant or related to random access procedure where the corresponding UL channel access priority p is not indicated, the UE determines p in Table 4.2.1-1 following the same procedures as for PUSCH transmission on configured resources using Type 1 channel access procedures.

When a UE uses Type 2A, Type 2B, or Type 2C UL channel access procedures for PUSCH transmissions indicated by a UL grant or related to random access procedures where the corresponding UL channel access priority p is not indicated, the UE assumes that the channel access priority class p=4 is used by the gNB for the Channel Occupancy Time.

A UE shall not transmit on a channel for a Channel Occupancy Time that exceeds $T_{ulm\ cot,p}$ where the channel access procedure is performed based on the channel access priority class p associated with the UE transmissions, as given in Table 4.2.1-1.

The total Channel Occupancy Time of autonomous uplink transmission(s) obtained by the channel access procedure in this clause, including the following DL transmission if the UE sets 'COT sharing indication' in AUL-UCI to '1' in a subframe within the autonomous uplink transmission(s) as described in Clause 4.1.3, shall not exceed $T_{ulm\ cot,p}$, where $T_{uml\ cot,p}$ is given in Table 4.2.1-1.

TABLE 4.2.1-1

Channel Access Priority Class (CAPC) for UL

| Channel Access Priority Class (p) | $m_p$ | $CW_{min,p}$ | $CW_{max,p}$ | $T_{ulm\ cot,p}$ | allowed $CW_p$ sizes |
| --- | --- | --- | --- | --- | --- |
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{ulm\ cot,\ p}$ = 10 ms if the higher layer parameter absenceOfAnyOtherTechnology-r14 or absenceOfAnyOtherTechnology-r16 is provided, otherwise, $T_{ulm\ cot,\ p}$ = 6 ms.
NOTE 2:
When $T_{ulm\ cot,\ p}$ = 6 ms it may be increased to 8 ms by inserting one or more gaps. The minimum duration of a gap shall be 100 us. The maximum duration before including any such gap shall be 6 ms.

4.2.1.0 Channel Access Procedures and UL Related Signaling 4.2.1.0.0 Channel Access Procedures upon Detection of a Common DCI If a UE detects 'UL duration and offset' field in DCI Format 1C as described in clause 5.3.3.1.4 of [5], the following are applicable:
  If the 'UL duration and offset' field indicates an 'UL offset' 1 and an 'UL duration' d for subframe n, then the scheduled UE may use channel access procedures Type 2 for transmissions in subframes n+l+i where i=0, 1, . . . d−1, irrespective of the channel access Type signalled in the UL grant for those subframes, if the end of UE transmission occurs in or before subframe n+l+d−1.
  If the 'UL duration and offset' field indicates an 'UL offset' 1 and an 'UL duration' d for subframe n and the 'COT sharing indication for AUL' field is set to '1', then a UE configured with autonomous UL may use channel access procedures Type 2 for autonomous UL transmissions assuming any priority class in subframes n+l+i where i=0,1, . . . d−1, if the end of UE autonomous UL transmission occurs in or before subframe n+l+d−1 and the autonomous UL transmission between n+l and n+l+d−1 shall be contiguous.
  If the 'UL duration and offset' field indicates an 'UL offset' 1 and an 'UL duration' d for subframe n and the 'COT sharing indication for AUL' field is set to '0', then a UE configured with autonomous UL shall not transmit autonomous UL in subframes n+l+i where i=0,1, . . . d−1.
If a UE determines the duration in time domain and the location in frequency domain of a remaining channel occupancy initiated by the gNB from a DCI format 2_0 as described in clause 11.1.1 of [7], the following is applicable:
  The UE may switch from Type 1 channel access procedures as described in clause 4.2.1.1 to Type 2A channel access procedures as described in clause 4.2.1.2.1 for its corresponding UL transmissions within the determined duration in time and location in frequency domain of the remaining channel occupancy. In this case, if the UL transmissions are PUSCH transmissions on configured resources, the UE may assume any priority class for the channel occupancy shared with the gNB.

4.2.1.0.2 Conditions for Maintaining Type 1 UL Channel Access Procedures

If a UE receives a DCI indicating a UL grant scheduling a PUSCH transmission using Type 1 channel access procedures or indicating a DL assignment scheduling a PUCCH transmission using Type 1 channel access procedures, and if the UE has an ongoing Type 1 channel access procedures before the PUSCH or PUCCH transmission starting time:
  If the UL channel access priority class value $p_1$ used for the ongoing Type 1 channel access procedures is same or larger than the UL channel access priority class value $p_2$ indicated in the DCI, the UE may transmit the PUSCH transmission in response to the UL grant by accessing the channel by using the ongoing Type 1 channel access procedure.
  If the UL channel access priority class value $p_1$ used for the ongoing Type 1 channel access procedure is smaller than the UL channel access priority class value $p_2$ indicated in the DCI, the UE shall terminate the ongoing channel access procedure.

The UE may transmit the PUCCH transmission in response to the DL grant by accessing the channel by using the ongoing Type 1 channel access procedures.

4.2.1.0.3 Conditions for Indicating Type 2 Channel Access Procedures

An eNB/gNB may indicate Type 2 channel access procedures in the DCI of a UL grant or DL assignment scheduling transmission(s) including PUSCH or PUCCH on a channel, respectively, as follows:

If the UL transmissions occur within the time interval starting at $t_0$ and ending at $t_0+T_{CO}$, where $$T_{CO}=T_{m\_cot,p}+T_g,$$

- $t_0$ is the time instant when the eNB/gNB has started transmission on the carrier according to the channel access procedure described in clause 4.1.1,
- $T_{m\_cot,p}$ value is determined by the eNB/gNB as described in clause 4.1.1,
- $T_g$ is the total duration of all gaps of duration greater than 25 us that occur between the DL transmission of the eNB/gNB and UL transmissions scheduled by the eNB/gNB, and between any two UL transmissions scheduled by the eNB/gNB starting from $t_0$, then,

- the eNB/gNB may indicate Type 2 channel access procedures in the DCI if the eNB/gNB has transmitted on the channel according to the channel access procedures described in clause 4.1.1, or
- the eNB may indicate using the 'UL duration and offset' field that the UE may perform a Type 2 channel access procedure for transmissions(s) including PUSCH on a channel in a subframe n when the eNB has transmitted on the channel according to the channel access procedure described in clause 4.1.1, or
- the eNB may indicate using the 'UL duration and offset' field and 'COT sharing indication for AUL' field that a UE configured with autonomous UL may perform a Type 2 channel access procedure for autonomous UL transmissions(s) including PUSCH on a channel in subframe n when the eNB has transmitted on the channel according to the channel access procedure described in clause 4.1.1 and acquired the channel using the largest priority class value and the eNB transmission includes PDSCH, or
- the eNB/gNB may schedule UL transmissions on a channel, that follow a transmission by the eNB/gNB on that channel with Type 2A channel access procedures for the UL transmissions as described in clause 4.2.1.2.1 after a duration of 25 us.

The eNB/gNB shall schedule UL transmissions between $t_0$ and $t_0+T_{CO}$ without gaps between consecutive UL transmissions if they can be scheduled contiguously. For a UL transmission on a channel that follows a transmission by the eNB/gNB on that channel using Type 2A channel access procedures as described in clause 4.2.1.2.1, the UE may use Type 2A channel access procedure for the UL transmission.

If the eNB/gNB indicates Type 2 channel access procedure for the UE in the DCI, the eNB/gNB indicates the channel access priority class used to obtain access to the channel in the DCI.

For indicating a Type 2 channel access procedure, if the gap is at least 25 us, or equal to 16 us, or up to 16 us, the gNB may indicate Type 2A, or Type 2B, or Type 2C UL channel procedures, respectively, as described in clauses 4.2.1.2.

4.2.1.0.4 Channel Access Procedures for UL Multi-Channel Transmission(s)

If a UE

- is scheduled to transmit on a set of channels C, and if Type 1 channel access procedure is indicated by the UL scheduling grants for the UL transmissions on the set of channels C, and if the UL transmissions are scheduled to start transmissions at the same time on all channels in the set of channels C, or
- intends to perform an uplink transmission on configured resources on the set of channels C with Type 1 channel access procedure, and if UL transmissions are configured to start transmissions on the same time all channels in the set of channels C, and
- if the channel frequencies of set of channels C is a subset of one of the sets of channel frequencies defined in clause 5.7.4 in [2]
  - the UE may transmit on channel $C_i \in C$ using Type 2 channel access procedure as described in clause 4.2.1.2,
    - if Type 2 channel access procedure is performed on channel $C_i$ immediately before the UE transmission on channel $C_j \in C$, i≠j, and
    - if the UE has accessed channel $C_j$ using Type 1 channel access procedure as described in clause 4.2.1.1,
      - where channel $C_j$ is selected by the UE uniformly randomly from the set of channels C before performing Type 1 channel access procedure on any channel in the set of channels C.
  - the UE may not transmit on channel $C_i \in C$ within the bandwidth of a carrier, if the UE fails to access any of the channels, of the carrier bandwidth, on which the UE is scheduled or configured by UL resources.

4.2.1.1 Type 1 UL Channel Access Procedure

This clause describes channel access procedures by a UE where the time duration spanned by the sensing slots that are sensed to be idle before a UL transmission(s) is random. The clause is applicable to the following transmissions:

- PUSCH/SRS transmission(s) scheduled or configured by eNB/gNB, or
- PUCCH transmission(s) scheduled or configured by gNB, or
- Transmission(s) related to random access procedure.

A UE may transmit the transmission using Type 1 channel access procedure after first sensing the channel to be idle during the slot durations of a defer duration $T_d$, and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;
2) if N>0 and the UE chooses to decrement the counter, set N=N 1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;

6) if the channel is sensed to be idle during all the slot durations of the additional defer duration $T_d$, go to step 4; else, go to step 5;

4.2.1.2 Type 2 UL Channel Access Procedure

This clause describes channel access procedures by UE where the time duration spanned by the sensing slots that are sensed to be idle before a UL transmission(s) is deterministic If a UE is indicated by an eNB to perform Type 2 UL channel access procedures, the UE follows the procedures described in clause 4.2.1.2.1.

4.2.1.2.1 Type 2A UL Channel Access Procedure

If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}$=25 us $T_{short\_ul}$ consists of a duration $T_f$=16 us immediately followed by one slot sensing slot and $T_f$ includes a sensing slot at start of $T_f$. The channel is considered to be idle for $T_{short\_ul}$ if both sensing slots of $T_{short\_ul}$, are sensed to be idle.

4.2.1.2.2 Type 2B UL Channel Access Procedure

If a UE is indicated to perform Type 2B UL channel access procedures, the UE uses Type 2B UL channel access procedure for a UL transmission. The UE may transmit the transmission immediately after sensing the channel to be idle within a duration of $T_f$=16 us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

4.2.1.2.3 Type 2C UL Channel Access Procedure

If a UE is indicated to perform Type 2C UL channel access procedures for a UL transmission, the UE does not sense the channel before the transmission. The duration of the corresponding UL transmission is at most 584 us.

4.2.2 Contention Window Adjustment Procedures

If a UE transmits transmissions using Type 1 channel access procedures that are associated with channel access priority class p on a channel, the UE maintains the contention window value $CW_p$ and adjusts $cvv_p$ for those transmissions before step 1 of the procedure described in clause 4.2.1.1, as described in this clause.

4.2.2.2 Contention Window Adjustment Procedures for UL Transmissions Scheduled/Configured by gNB If a UE transmits transmissions using Type 1 channel access procedures that are associated with channel access priority class p on a channel, the UE maintains the contention window value $CW_p$ and adjusts $CW_p$ for those transmissions before step 1 of the procedure described in clause 4.2.1.1, using the following steps:

1) For every priority class $p \in \{1,2,3,4\}$, set $CW_p = CW_{min,p}$;
2) If HARQ-ACK feedback is available after the last update of $CW_p$, go to step 3. Otherwise, if the UE transmission after procedure described in clause 4.2.1.1 does not include a retransmission or is transmitted within a duration $T_w$ from the end of the reference duration corresponding to the earliest UL channel occupancy after the last update of $CW_p$, go to step 5; otherwise go to step 4.
3) The HARQ-ACK feedback(s) corresponding to PUSCH(s) in the reference duration for the latest UL channel occupancy for which HARQ-ACK feedback is available is used as follows:
   a. If at least one HARQ-ACK feedback is 'ACK' for PUSCH(s) with transport block (TB) based feedback or at least 10% of HARQ-ACK feedbacks are 'ACK' for PUSCH CBGs transmitted at least partially on the channel with code block group (CBG) based feedback, go to step 1; otherwise go to step 4.
4) Increase $CW_p$ for every priority class $p \in \{1,2,3,4\}$ to the next higher allowed value;
5) For every priority class $p \in \{1,2,3,4\}$, maintain $CW_p$ as it is; go to step 2.

4.2.2.3 Common Procedures for CWS Adjustments for UL Transmissions

The following applies to the procedures described in clauses 4.2.2.1 and 4.2.2.2:
If $CW_p = CW_{max,p}$, the next higher allowed value for adjusting $CW_p$ is $CW_{max,p}$.
If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by UE from the set of values $\{1, 2, \ldots, 8\}$ for each priority class $p \in \{1,2,3,4\}$.

4.2.3 Energy Detection Threshold Adaptation Procedure

A UE accessing a channel on which UL transmission(s) are performed, shall set the energy detection threshold ($X_{Thresh}$) to be less than or equal to the maximum energy detection threshold $X_{Thresh\_max}$.

$X_{Thresh\_max}$ is determined as follows:
If the UE is configured with higher layer parameter maxEnergyDetectionThreshold-r14 or maxEnergyDetectionThreshold-r16,
  $X_{Thresh\_max}$ is set equal to the value signalled by the higher layer parameter;
otherwise
  the UE shall determine $X_{Thresh\_max}$ according to the procedure described in clause 4.2.3.1;
  if the UE is configured with higher layer parameter energyDetectionThresholdOffset-r14 or energyDetectionThresholdOffset-r16
    $X_{Thresh\_max}$ is set by adjusting $X'_{Thresh\_max}$ according to the offset value signalled by the higher layer parameter;
  otherwise
    the UE shall set $X_{Thresh\_max} = X'_{Thresh\_max}$.

4.3 Channel Access Procedures for Semi-Static Channel Occupancy

Channel assess procedures based on semi-static channel occupancy as described in this Clause, are intended for environments where the absence of other technologies is guaranteed e.g., by level of regulations, private premises policies, etc. If a gNB provides UE(s) with higher layer parameters ChannelAccessMode-r16='semistatic' by SIB1 or dedicated configuration, a periodic channel occupancy can be initiated by the gNB every $T_x$ within every two consecutive radio frames, starting from the even indexed radio frame at $i \cdot T_x$ with a maximum channel occupancy time $T_y=0.95T_x$, where $T_x$=period in ms, is a higher layer parameter provided in SemiStaticChannelAccessConfig and $$i \in \left\{0, 1, \ldots, \frac{20}{T_X} - 1\right\}.$$

In the following procedures in this clause, when a gNB or UE performs sensing for evaluating a channel availability, the sensing is performed at least during a sensing slot duration $T_{sl}=9$ us. The corresponding $X_{Thresh}$ adjustment for performing sensing by a gNB or a UE is described in clauses 4.1.5 and 4.2.3, respectively.

A channel occupancy initiated by a gNB and shared with UE(s) shall satisfy the following:

The gNB shall transmit a DL transmission burst starting at the beginning of the channel occupancy time immediately after sensing the channel to be idle for at least a sensing slot duration $T_{sl}=9$ us. If the channel is sensed to be busy, the gNB shall not perform any transmission during the current period.

The gNB may transmit a DL transmission burst(s) within the channel occupancy time immediately after sensing the channel to be idle for at least a sensing slot duration $T_{sl}=9$ us if the gap between the DL transmission burst(s) and any previous transmission burst is more than 16 us.

The gNB may transmit DL transmission burst(s) after UL transmission burst(s) within the channel occupancy time without sensing the channel if the gap between the DL and UL transmission bursts is at most 16 us.

A UE may transmit UL transmission burst(s) after detection of a DL transmission burst(s) within the channel occupancy time as follows:

If the gap between the UL and DL transmission bursts is at most 16 us, the UE may transmit UL transmission burst(s) after a DL transmission burst(s) within the channel occupancy time without sensing the channel.

If the gap between the UL and DL transmission bursts is more than 16 us, the UE may transmit UL transmission burst(s) after a DL transmission burst(s) within the channel occupancy time after sensing the channel to be idle for at least a sensing slot duration $T_{sl}=9$ us within a 25 us interval ending immediately before transmission.

The gNB and UEs shall not transmit any transmissions in a set of consecutive symbols for a duration of at least $T_z =\max(0.05 T_x, 100$ us$)$ before the start of the next period.

If a UE fails to access the channel(s) prior to an intended UL transmission to a gNB, Layer 1 notifies higher layers about the channel access failure.

Quotation End

There is a study of operation in frequency band higher than 52.6 GHz. Some amendment is under consideration as there are several different characteristics which is different from the lower conventional frequency band, e.g. wider available bandwidth/larger (phase) noise/ICI. Therefore, it is expected that a larger subcarrier spacing, e.g. up to 960 kHz, and a bandwidth of a cell would be increased to GHz level, e.g. 1 or 2 GHz. Also since there are unlicensed spectrum in the considered frequency band, it is also under discussion whether there is any change required for channel accessing scheme. For example, there could be some cases a device could access the channel/spectrum without LBT, e.g. No-LBT. Also there are some adjustment on LBT considered, such as directional LBT or receiver assistant LBT, as quoted from [3] RP-202925 below:

Quotation Start

According to the outcome of the study item on Supporting NR above 52.6 GHz and leveraging FR2 design to the extent possible, this WI extends NR operation up to 71 GHz considering, both, licensed and unlicensed operation, with the following objectives:

Physical layer aspects including [RAN1]:
In addition to 120 kHz SCS, specify new SCS, 480 kHz and 960 kHz, and define maximum bandwidth(s), for operation in this frequency range for data and control channels and reference signals, only NCP supported.

Note: Except for timing line related aspects, a common design framework shall be adopted for 480kHz to 960 kHz Time line related aspects adapted to 480 kHz and 960 kHz, e.g., BWP and beam switching timeing, HARQ timing, UE processing, preparation and computation timelines for PDSCH, PUSCH/SRS and CSI, respectively.

Support of up to 64 SSB beams for licensed and unlicensed operation in this frequency range.

Supports 120 kHz SCS for SSB and 120 kHz SCS for initial access related signals/channels in an initial BWP.

Study and specify, if needed, additional SCS (240 kHz, 480 kHz, 960 kHz) for SSB, and additional SCS(480 kHz, 960 kHz) for initial access related signals/channels in initial BWP.

Study and specify, if needed, additional SCS (480 kHz, 960 kHz) for SSB for cases other than initial access.

Note: coverage enhancement for SSB is not pursued.
Specify timing associated with beam-based operation to new SCS (i.e., 480 kHz and/or 960 kHz), study, and specify if needed, potential enhancement for shared spectrum operation Study which beam management will be used as a basis: R15/16 or R17 in RAN #91-e Support enhancement for PUCCH format 0/1/4 to increase the number of RBs under PSD limitation in shared spectrum operation.

Support enhancements for multi-PDSCH/PUSCH scheduling and HARQ support with a single DCI
Note: coverage enhancement for multi-PDSCH/PUSCH scheduling is not pursued Support enhancement to PDCCH monitoring, including blind detection/CCE budget, and multi-slot span monitoring, potential limitation to UE PDCCH configuration and capability related to PDCCH monitoring.

Specify support for PRACH sequence lengths (i.e. L=139, L=571 and L=1151) and study, if needed, specify support for RO configuration for non-consecutive RACH occasions (RO) in time domain for operation in shared spectrum Evaluate, and if needed, specify the PTRS enhancement for 120 kHz SCS, 480 kHz SCS and/or 960 kHz SCS, as well as DMRS enhancement for 480 kHz SCS and/or 960 kHz SCS.

Physical layer procedure(s) including [RAN1]:

Channel access mechanism assuming beam based operation in order to comply with the regulatory requirements applicable to unlicensed spectrum for frequencies between 52.6 GHz and 71 GHz.

Specify both LBT and No-LBT related procedures, and for No-LBT case no additional sensing mechanism is specified.

Study, and if needed specify, omni-directional LBT, directional LBT and receiver assistance in channel access Study, and if needed specify, energy detection threshold enhancement Quotation End Time duration or time period, e.g. time resource(s), of a transmission could be indicated or predefined.

Different signals or channel could use different ways for determining time duration or time period. For example, the time duration/period could be configured, e.g. by a RRC configuration. The time duration/period could be scheduled by a DCI, e.g. dynamically. The time duration/period could be semi-persistent scheduled, e.g. configured by RRC configuration and activate/deactivated by a DCI. The time duration/period could be one or more (consecutive) symbols or one or more (consecutive) slots. Frequency domain resource allocation could be done in a similar way, such as predefined, configured, scheduled by a DCI or semi-persistently scheduled. More details on how to determine a time resource(s) and/or frequency resource(s) of a transmission is quoted below.

Quotation Start 5.1.2 Resource Allocation 5.1.2.1 Resource Allocation in Time Domain When the UE is scheduled to receive PDSCH by a DCI, the Time domain resource assignment field value m of the DCI provides a row index m+1 to an allocation table. The determination of the used resource allocation table is defined in Clause 5.1.2.1.1. The indexed row defines the slot offset $K_0$, the start and length indicator SLIV, or directly the start symbol S and the allocation length L, and the PDSCH mapping type to be assumed in the PDSCH reception.

Given the parameter values of the indexed row:
The slot allocated for the PDSCH is K where $$K_S = \left\lfloor n \cdot \frac{2^{\mu_{PDSCH}}}{2^{\mu_{PDCCH}}} \right\rfloor + K_0 + \left[ \left( \frac{N_{slot,offset,PDCCH}^{CA}}{2^{\mu_{offset,PDCCH}}} - \frac{N_{slot,offset,PDSCH}^{CA}}{2^{\mu_{offset,PDSCH}}} \right) \cdot 2^{\mu_{PDSCH}} \right],$$

if UE is configured with ca-SlotOffset for at least one of the scheduled and scheduling cell, and $$K_s = \left\lfloor n \cdot \frac{2^{\mu_{PDSCH}}}{2^{\mu_{PDCCH}}} \right\rfloor + K_0,$$

otherwise, and where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and $N_{slot,offset,PDCCH}^{CA}$ and $\mu_{offset,PDCCH}$ are the $N_{slot,offset}^{CA}$ and the $\mu_{offset}$, respectively, which are determined by higher layer configured ca-SlotOffset, for the cell receiving the PDCCH respectively, $N_{slot,offset,PDSCH}^{CA}$ and $\mu_{offset,PDSCH}$ are the $N_{slot,offset}^{CA}$ and the $\mu_{offset}$, respectively, which are determined by higher-layer configured ca-SlotOffset for the cell receiving the PDSCH, as defined in clause 4.5 of [4, TS 38.211].

The reference point $S_0$ for starting symbol S is defined as:
if configured with referenceOfSLIVDCI-1-2, and when receiving PDSCH scheduled by DCI format 1_2 with CRC scrambled by C-RNTI, MCS-C-RNTI, CS-RNTI with $K_0=0$, and PDSCH mapping Type B, the starting symbol S is relative to the starting symbol So of the PDCCH monitoring occasion where DCI format 1_2 is detected;
otherwise, the starting symbol S is relative to the start of the slot using $S_0=0$.

The number of consecutive symbols L counting from the starting symbol S allocated for the PDSCH are determined from the start and length indicator SLIV:

if (L − 1) ≤ 7 then
   SLIV = 14 · (L − 1) + S
else
   SLIV = 14 · (14 − L + 1) + (14 − 1 − S)

where 0<L≤14−S , and
the PDSCH mapping type is set to Type A or Type B as defined in Clause 7.4.1.1.2 of [4, TS 38.211].

The UE shall consider the S and L combinations defined in table 5.1.2.1-1 satisfying $S_0+S+L \leq 14$ for normal cyclic prefix and $S_0+S+L \leq 12$ for extended cyclic prefix as valid PDSCH allocations:

TABLE 5.1.2.1-1

| PDSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, . . . , 13} | {2, . . . , 14} | {0, . . . , 10} | {2, 4, 6} | {2, . . . , 12} |

Note 1:
S = 3 is applicable only if dmrs-TypeA-Position = 3

[ . . . ]

Two downlink resource allocation schemes, type 0 and type 1, are supported. The UE shall assume that when the scheduling grant is received with DCI format 1_0, then downlink resource allocation type 1 is used.

If the scheduling DCI is configured to indicate the downlink resource allocation type as part of the 'Frequency domain resource assignment' field by setting a higher layer parameter resourceAllocation in PDSCH-Config to 'dynamicSwitch', for DCI format 1_1 or setting a higher layer parameter resourceAllocationDCI-1-2 in PDSCH-Config to 'dynamicSwitch' for DCI format 1_2, the UE shall use downlink resource allocation type 0 or type 1 as defined by this DCI field. Otherwise the UE shall use the downlink frequency resource allocation type as defined by the higher layer parameter resourceAllocation for DCI format 1_1 or by the higher layer parameter resourceAllocationDCI-1-2 for DCI format 1_2.

If a bandwidth part indicator field is not configured in the scheduling DCI or the UE does not support active BWP change via DCI, the RB indexing for downlink type 0 and type 1 resource allocation is determined within the UE's active bandwidth part. If a bandwidth part indicator field is configured in the scheduling DCI and the UE supports active BWP change via DCI, the RB indexing for downlink type 0 and type 1 resource allocation is determined within the UE's bandwidth part indicated by bandwidth part indicator field value in the DCI. The UE shall upon detection of PDCCH intended for the UE determine first the downlink bandwidth part and then the resource allocation within the bandwidth part.

For a PDSCH scheduled with a DCI format 1_0 in any type of PDCCH common search space, regardless of which bandwidth part is the active bandwidth part, RB numbering starts from the lowest RB of the CORESET in which the DCI was received; otherwise RB numbering starts from the lowest RB in the determined downlink bandwidth part.

5.1.2.2.1 Downlink Resource Allocation Type 0

In downlink resource allocation of type 0, the resource block assignment information includes a bitmap indicating the Resource Block Groups (RBGs) that are allocated to the scheduled UE where a RBG is a set of consecutive virtual resource blocks defined by higher layer parameter rbg-Size configured by PDSCH-Config and the size of the bandwidth part as defined in Table 5.1.2.2.1-1.

TABLE 5.1.2.2.1-1

| | Nominal RBG size P | |
| --- | --- | --- |
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The total number of RBGs ($N_{RBG}$) for a downlink bandwidth part i of size $N_{BWP}^{size}$ PRBs is given by $N_{RBG} = \lceil (N_{BWP,j}^{size} + (N_{BWP,j}^{start} \mod P))/P \rceil$, where the size of the first RBG is $RBG_0^{size} = P - N_{BWP,j}^{start} \mod P$, the size of last RBG is $RBG_{last}^{size} = (N_{BWP,j}^{start} + N_{BWP,j}^{size}) \mod P$ if $(N_{BWP,j}^{start} + N_{BWP,j}^{size}) \mod P > 0$ and P otherwise, the size of all other RBGs is P.

The bitmap is of size $N_{RBG}$ bits with one bitmap bit per RBG such that each RBG is addressable. The RBGs shall be indexed in the order of increasing frequency and starting at the lowest frequency of the bandwidth part. The order of RBG bitmap is such that RBG 0 to RBG $N_{RBG}-1$ are mapped from MSB to LSB. The RBG is allocated to the UE if the corresponding bit value in the bitmap is 1, the RBG is not allocated to the UE otherwise.

5.1.2.2.2 Downlink Resource Allocation Type 1

In downlink resource allocation of type 1, the resource block assignment information indicates to a scheduled UE a set of contiguously allocated non-interleaved or interleaved virtual resource blocks within the active bandwidth part of size $N_{BWP}^{size}$ PRBs except for the case when DCI format 1_0 is decoded in any common search space in which case the size of CORESET 0 shall be used if CORESET 0 is configured for the cell and the size of initial DL bandwidth part shall be used if CORESET 0 is not configured for the cell.

A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

When the DCI size for DCI format 1_0 in USS is derived from the size of DCI format 1_0 in CSS but applied to an active BWP with size of $N_{BWP}^{active}$, a downlink type 1 resource block assignment field consists of a resource indication value (RIV) corresponding to a starting resource block $RB_{start} = 0, K \cdot 2K, \ldots, (N_{BWP}^{initial}-1) \cdot K$ and a length in terms of virtually contiguously allocated resource blocks $L_{RBs} = K, 2 \cdot K, \ldots, N_{BWP}^{initial} \cdot K$, where $N_{BWP}^{initial}$ is given by the size of CORESET 0 if CORESET 0 is configured for the cell;

the size of initial DL bandwidth part if CORESET 0 is not configured for the cell.

The resource indication value is defined by:

if $(L'_{RBs}-1) \leq \lfloor N_{BWP}^{initial}/2 \rfloor$ then $RIV = N_{BWP}^{initial}(L'_{RBs}-1) + RB'_{start}$ else $RIV = N_{BWP}^{initial}(N_{BWP}^{initial} - L'_{RBs}+1) + N_{BWP}^{initial}-1-RB'_{start})$ where $L'_{RBs} = L_{RBs}/K$, $RB'_{start} = RB_{start}/K$ and where $L'_{RB}$ shall not exceed $N_{BWP}^{initial} - RB'_{start}$.

If $N_{BWP}^{active} > N_{BWP}^{initial}$, K is the maximum value from set $\{1, 2, 4, 8\}$ which satisfies $K \leq \lfloor N_{BWP}^{active}/N_{BWP}^{initial} \rfloor$; otherwise K = 1.

When the scheduling grant is received with DCI format 1_2, a downlink type 1 resource allocation field consists of a resource indication value (RIV) corresponding to a starting resource block group $RBG_{start} = 0, 1, \ldots, N_{RBG}-1$ and a length in terms of virtually contiguously allocated resource block groups $L_{RBGs} = 1, \ldots, N_{RBG}$, where the resource block groups are defined as in 5.1.2.2.1 with P defined by resourceAllocationType1GranularityDCI-1-2 if the UE is configured with higher layer parameter resource AllocationType1GranularityDCI-1-2, and P=1 otherwise. The resource indication value is defined by if $(L_{RBGs}-1) \leq \lfloor N_{RBG}/2 \rfloor$ then $RIV = N_{RBG}(L_{RBGs}-1) + RBG_{start}$ else $RIV = N_{RBG}(N_{RBG} - L_{RBGs}+1) + (N_{RBG}-1-RBG_{start})$ where $L_{RBGS} \geq 1$ and shall not exceed $N_{RBG} - RBG_{start}$. [ . . . ]

6.1.2 Resource Allocation

6.1.2.1 Resource Allocation in Time Domain

When the UE is scheduled to transmit a transport block and no CSI report, or the UE is scheduled to transmit a transport block and a CSI report(s) on PUSCH by a DCI, the 'Time domain resource assignment' field value m of the DCI provides a row index m+1 to an allocated table. The determination of the used resource allocation table is defined in Clause 6.1.2.1.1. The indexed row defines the slot offset $K_2$, the start and length indicator SLIV, or directly the start symbol S and the allocation length L, the PUSCH mapping type, and the number of repetitions (if numberOfRepetitions is present in the resource allocation table) to be applied in the PUSCH transmission.

When the UE is scheduled to transmit a PUSCH with no transport block and with a CSI report(s) by a 'CSI request' field on a DCI, the 'Time domain resource assignment' field value m of the DCI provides a row index m+1 to the allocated table as defined in Clause 6.1.2.1.1. The indexed row defines the start and length indicator SLIV, or directly the start symbol S and the allocation length L, and the PUSCH mapping type to be applied in the PUSCH transmission and the $K_2$ value is determined as $$K_2 = \max_j Y_j(m+1),$$

where $Y_j$, j=0, ..., $NR_{REP}-1$ are the corresponding list entries of the higher layer parameter

- reportSlotOffsetListDCI-0-2, if PUSCH is scheduled by DCI format 0_2 and reportSlotOffsetListDCI-0-2 is configured;
- reportSlotOffsetListDCI-0-1, if PUSCH is scheduled by DCI format 0_1 and reportSlotOffsetListDCI-0-1 is configured;
- reportSlotOffsetList, otherwise;

in CSI-ReportConfig for the $N_{Rep}$ triggered CSI Reporting Settings and $Y_j(m+1)$ is the (m+1)th entry of $Y_j$.

The slot $K_s$ where the UE shall transmit the PUSCH is determined by $K_2$ as $K_s=$ $$\left\lfloor n \cdot \frac{2^{\mu_{PUSCH}}}{2^{\mu_{PDCCH}}} \right\rfloor + K_2 + \left\lfloor \left( \frac{N^{CA}_{slot,offset,PDCCH}}{2^{\mu_{offset,PDCCH}}} - \frac{N^{CA}_{slot,offset,PUSCH}}{2^{\mu_{offset,PUSCH}}} \right) \cdot 2^{\mu_{PUSCH}} \right\rfloor,$$

if UE is configured with ca-SlotOffset for at least one of the scheduled and scheduling cell, $$K_s = \left\lfloor n \cdot \frac{2^{\mu_{PUSCH}}}{2^{\mu_{PDCCH}}} \right\rfloor + K_2,$$

otherwise, and where n is the slot with the scheduling DCI, $K_2$ is based on the numerology of PUSCH, and $\mu_{PUSCH}$ and $\mu_{PDCCH}$ are the subcarrier spacing configurations for PUSCH and PDCCH, respectively, $N_{slot,offset,PDCCH}^{CA}$ and $\mu_{offset,PDCCH}$ are the $N_{slot,offset}^{CA}$ and the $\mu_{offset}$, respectively, which are determined by higher-layer configured ca-SlotOffset for the cell receiving the PDCCH, $N_{slot,offset,PUSCH}^{CA}$ and $\mu_{offset,PUSCH}$ are the $N_{slot,offset}^{CA}$ and the $\mu_{offset}$, respectively, which are determined by higher-layer configured ca-SlotOffset for the cell transmitting the PUSCH, as defined in clause 4.5 of [4, TS 38.211], and for PUSCH scheduled by DCI format 0_1, if puschRepTypeIndicatorDCI-0-1 is set to 'punch-RepTypeB', the UE applies PUSCH repetition Type B procedure when determining the time domain resource allocation. For PUSCH scheduled by DCI format 0_2, if puschRepTypeIndicatorDCI-0-2 is set to 'punch-RepTypeB', the UE applies PUSCH repetition Type B procedure when determining the time domain resource allocation. Otherwise, the UE applies PUSCH repetition Type A procedure when determining the time domain resource allocation for PUSCH scheduled by PDCCH.

For PUSCH repetition Type A, the starting symbol S relative to the start of the slot, and the number of consecutive symbols L counting from the symbol S allocated for the PUSCH are determined from the start and length indicator SLIV of the indexed row:

```
if (L - 1) ≤ 7 then
    SLIV = 14 · (L - 1) + S
else
    SLIV = 14 · (14 - L + 1) + (14 - 1 - S)
``` where $0 < L \leq 14-S$, and

For PUSCH repetition Type B, the starting symbol S relative to the start of the slot, and the number of consecutive symbols L counting from the symbol S allocated for the PUSCH are provided by startSymbol and length of the indexed row of the resource allocation table, respectively.

For PUSCH repetition Type A, the PUSCH mapping type is set to Type A or Type B as defined in Clause 6.4.1.1.3 of [4, TS 38.211] as given by the indexed row.

For PUSCH repetition Type B, the PUSCH mapping type is set to Type B.

The UE shall consider the S and L combinations defined in table 6.1.2.1-1 as valid PUSCH allocations

TABLE 6.1.2.1-1

| PUSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A (repetition Type A only) | 0 | {4, ..., 14} | {4, ..., 14} | 0 | {4, ..., 12} | {4, ..., 12} |
| Type B | {0, ..., 13} | {1, ..., 14} | {1, ..., 14} for repetition Type A, {1, ..., 27} for repetition Type B | {0, ..., 11} | {1, ..., 12} | {1, ..., 12} for repetition Type A, {1, ..., 23} for repetition Type B |

6.1.2.2 Resource Allocation in Frequency Domain

The UE shall determine the resource block assignment in frequency domain using the resource allocation field in the detected PDCCH DCI except for a PUSCH transmission scheduled by a RAR UL grant or fallbackRAR UL grant, in which case the frequency domain resource allocation is determined according to clause 8.3 of [6, 38.213] or a MsgA PUSCH transmission with frequency domain resource allocation determined according to clause 8.1A of [6, 38.213]. Three uplink resource allocation schemes type 0, type 1 and type 2 are supported. Uplink resource allocation scheme type 0 is supported for PUSCH only when transform precoding is disabled. Uplink resource allocation scheme type 1 and type 2 are supported for PUSCH for both cases when transform precoding is enabled or disabled.

If the scheduling DCI is configured to indicate the uplink resource allocation type as part of the 'Frequency domain resource' assignment field by setting a higher layer parameter resourceAllocation in pusch-Config to 'dynamicSwitch', for DCI format 0_1 or setting a higher layer parameter resourceAllocationDCI-0-2 in pusch-Config to 'dynamicSwitch' for DCI format 0_2, the UE shall use uplink resource allocation type 0 or type 1 as defined by this DCI field. Otherwise the UE shall use the uplink frequency resource allocation type as defined by the higher layer parameter resourceAllocation for DCI format 0_1 or the higher layer parameter resourceAllocationDCI-0-2 for DCI format 0_2. The UE shall assume that when the scheduling PDCCH is received with DCI format 0_1 and useInterlacePUCCH-PUSCH in BWP-UplinkDedicated is configured, uplink type 2 resource allocation is used.

The UE shall assume that when the scheduling PDCCH is received with DCI format 0_0, then uplink resource allocation type 1 is used, except when any of the higher layer parameters useInterlacePUCCH-PUSCH in BWP-UplinkCommon and useInterlacePUCCH-PUSCH in BWP-UplinkDedicated is configured in which case uplink resource allocation type 2 is used.

The UE expects that either none or both of useInterlacePUCCH-PUSCH in BWP-UplinkCommon and useInterlacePUCCH-PUSCH in BWP-UplinkDedicated is configured.

If a bandwidth part indicator field is not configured in the scheduling DCI or the UE does not support active bandwidth part change via DCI, the RB indexing for uplink type 0, type 1 and type 2 resource allocation is determined within the UE's active bandwidth part. If a bandwidth part indicator field is configured in the scheduling DCI and the UE supports active bandwidth part change via DCI, the RB indexing for uplink type 0, type 1, type 2 resource allocation is determined within the UE's bandwidth part indicated by bandwidth part indicator field value in the DCI. The UE shall upon detection of PDCCH intended for the UE determine first the uplink bandwidth part and then the resource allocation within the bandwidth part. RB numbering starts from the lowest RB in the determined uplink bandwidth part.

6.1.2.2.1 Uplink Resource Allocation Type 0

In uplink resource allocation of type 0, the resource block assignment information includes a bitmap indicating the Resource Block Groups (RBGs) that are allocated to the scheduled UE where a RBG is a set of consecutive virtual resource blocks defined by higher layer parameter rbg-Size configured in pusch-Config and the size of the bandwidth part as defined in Table 6.1.2.2.1-1.

TABLE 6.1.2.2.1-1

| Bandwidth Part Size | Nominal RBG size P | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

The total number of RBGs ($N_{RBG}$) for a uplink bandwidth part i of size $N_{BWP}^{size}$. PRBs is given by $N_{RBG} [(N_{BWP,i}^{size} + (N_{BWP,i}^{start} \mod P))/P]$ where the size of the first RBG is $RB_1^{size} = P - N_{BWP,i}^{start} \mod P$, the size of the last RBG is $RBG_{last}^{size} = (N_{BWP,i}^{start} + N_{BWP,i}^{size}) \mod P$ if $(N_{BWP,i}^{start} + N_{BWP,i}^{size}) \mod P > 0$ and P otherwise.

the size of all other RBG is P.

The bitmap is of size $N_{RBG}$ bits with one bitmap bit per RBG such that each RBG is addressable. The RBGs shall be indexed in the order of increasing frequency of the bandwidth part and starting at the lowest frequency. The order of RBG bitmap is such that RBG 0 to RBG $N_{RBG}-1$ are mapped from MSB to LSB of the bitmap. The RBG is allocated to the UE if the corresponding bit value in the bitmap is 1, the RBG is not allocated to the UE otherwise.

In frequency range 1, only 'almost contiguous allocation' defined in [8, TS 38.101-1] is allowed as non-contiguous allocation per component carrier for UL RB allocation for CP-OFDM.

In frequency range 2, non-contiguous allocation per component carrier for UL RB allocation for CP-OFDM is not supported.

6.1.2.2.2 Uplink Resource Allocation Type 1

In uplink resource allocation of type 1, the resource block assignment information indicates to a scheduled UE a set of contiguously allocated non-interleaved virtual resource blocks within the active bandwidth part of size $N_{BWP}^{size}$ PRBs except for the case when DCI format 0_0 is decoded in any common search space in which case the size of the initial UL bandwidth part $N_{BWP,0}^{size}$ shall be used.

An uplink type 1 resource allocation field consists of a resource indication value (RIV) corresponding to a starting virtual resource block ($RB_{start}$) and a length in terms of contiguously allocated resource blocks $L_{RBs}$. The resource indication value is defined by $$
\begin{aligned}
&\text{if } (L_{RBs} - 1) \leq \lfloor N_{BWP}^{size}/2 \rfloor \text{ then} \\
&\quad RIV = N_{BWP}^{size}(L_{RBs} - 1) + RB_{start} \\
&\text{else} \\
&\quad RIV = N_{BWP}^{size}(N_{BWP}^{size} - L_{RBs} + 1) + \\
&\quad (N_{BWP}^{size} - 1 - RB_{start})
\end{aligned}
$$

where $L_{RBs} \geq 1$ and shall not exceed $N_{BWP}^{size} - RB_{start}$.

6.1.2.2.3 Uplink Resource Allocation Type 2

In uplink resource allocation of type 2, the resource block assignment information defined in [5, TS 38.212] indicates to a UE a set of up to M interlace indices, and for DCI 0_0 monitored in a UE-specific search space and DCI 0_1 a set of up to $N_{RB-set,UL}^{BWP}$ contiguous RB sets, where M and interlace indexing are defined in Clause 4.4.4.6 in [4, TS 38.211]. Within the active UL BWP, the assigned physical resource block n is mapped to virtual resource block n. For DCI 0_0 monitored in a UE-specific search space and DCI 0_1, the UE shall determine the resource allocation in frequency domain as an intersection of the resource blocks of the indicated interlaces and the union of the indicated set of RB sets and intra-cell guard bands defined in Clause 7 between the indicated RB sets, if any.

...

For $\mu=0$, the X=6 MSBs of the resource block assignment information indicates to a UE a set of allocated interlace indices $m_0+l$, where the indication consists of a resource indication value (RIV). For $0 \leq RIV < M(M+1)/2$, $l=0,1, \ldots L-1$ the resource indication value corresponds to the starting interlace index $m_0$ and the number of contiguous interlace indices $L (L \geq 1)$. The resource indication value is defined by:

$$\begin{aligned}&\text{if } (L-1) \leq [M/2] \text{ then} \\ &\quad RIV = M(L-1) + m_0 \\ &\text{else} \\ &\quad RIV = M(M-L+1) + (M-1-m_0)\end{aligned}$$

For $IV \geq M(M+1)/2$, the resource indication value corresponds to the starting interlace index $m_0$ and the set of values 1 according to Table 6.1.2.3-1.

6.1.2.3 Resource Allocation for Uplink Transmission with Configured Grant

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission:
For Type 1 PUSCH transmissions with a configured grant, the following parameters are given in configuredGrant-Config unless mentioned otherwise:
  For the determination of the PUSCH repetition type, if the higher layer parameter pusch-RepTypeIndicator in rrc-ConfiguredUplinkGrant is configured and set to 'punch-RepTypeB', PUSCH repetition type B is applied; otherwise, PUSCH repetition type A is applied;
  For PUSCH repetition type A, the selection of the time domain resource allocation table follows the rules for DCI format 0_0 on UE specific search space, as defined in Clause 6.1.2.1.1.
  For PUSCH repetition type B, the selection of the time domain resource allocation table is as follows:
    If pusch-RepTypeIndicatorDCI-0-1 in pusch-Config is configured and set to 'punch-RepTypeB', pusch-TimeDomainResourceAllocationListDCI-0-1 in pusch-Config is used;
    Otherwise, pusch-TimeDomainResourceAllocationListDCI-0-2 in pusch-Config is used.
    It is not expected that pusch-RepTypeIndicator in rrc-ConfiguredUplinkGrant is configured with 'pusch-RepTypeB' when none of pusch-RepTypeIndicatorDCI-0-1 and pusch-RepTypeIndicatorDCI-0-2 in pusch-Config is set to 'pusch-RepTypeB'.
  The higher layer parameter timeDomainAllocation value m provides a row index m+1 pointing to the determined time domain resource allocation table, where the start symbol and length are determined following the procedure defined in Clause 6.1.2.1;
  Frequency domain resource allocation is determined by the N LSB bits in the higher layer parameter frequencyDomainAllocation, forming a bit sequence $f_{17}, \ldots, f_1, f_0$, where $f_0$ is the LSB, according to the procedure in Clause 6.1.2.2 and N is determined as the size of frequency domain resource assignment field in DCI format 0_1 for a given resource allocation type indicated by resourceAllocation, except if useInterlacePUCCH-PUSCH in BWP-UplinkDedicated is configured, in which case uplink type 2 resource allocation is used wherein the UE interprets the LSB bits in the higher layer parameter frequencyDomainAllocation as for the frequency domain resource assignment field of DCI 0_1 according to the procedure in Clause 6.1.2.2.3;
  The $I_{MCS}$ is provided by higher layer parameter mcsAndTBS;
  Number of DM-RS CDM groups, DM-RS ports, SRS resource indication and DM-RS sequence initialization are determined as in Clause 7.3.1.1.2 of [5, TS 38.212], and the antenna port value, the bit value for DM-RS sequence initialization, precoding information and number of layers, SRS resource indicator are provided by antennaPort, dmrs-SeqInitialization, precodingAndNumberOfLayers, and srs-ResourceIndicator respectively;
  When frequency hopping is enabled, the frequency offset between two frequency hops can be configured by higher layer parameter frequencyHoppingOffset.

Quotation End

As detailed above, there could be at least two channel access modes, e.g., Listen-before-Talk (LBT) and No-LBT for higher frequency bands, e.g., >52.6 GHz. Also, LBT could be split into different types, e.g., omni-directional LBT, directional LBT, and receiver-assistant LBT. There could be tradeoffs between these different modes/types. For example, No-LBT mode could reduce latency of transmission to bring benefits in terms of throughput, e.g., when there is no collision between the transmission(s) that took place (e.g., from one receiver perspective). On the other hand, LBT would be a better choice when the transmissions collide with each other, resulting in decoding failure (e.g., from one receiver perspective). There may be some criteria for a device to judge and determine properly whether and/or how to perform LBT.

Methods and concepts of the present invention are directed to determining whether and/or how to perform LBT for a transmission based on a property of the transmission. The property could be a resource allocation for the transmission. The property could be a way to allocate resources for the transmission. The property could be a length or size of a resource allocated for the transmission. The property could be an amount of resources allocated for the transmission. The resource allocation could be a time domain resource allocation and/or a frequency domain resource allocation.

In various embodiments, the device determines whether to perform LBT for a transmission, or not, based on a resource allocation of the transmission. The device can determine whether to perform LBT for a transmission, or not, based on the amount of resources allocated for the transmission. The device can perform LBT for a transmission if/when the resource allocated for the transmission is more than a threshold. The device may not perform LBT for a transmission if/when the resource allocated for the transmission is less than a threshold. The threshold can be a number of Physical Resource Blocks (PRBs). The threshold can be a number of symbols. The threshold can be a number of slots. The threshold can be one slot. The threshold can be predefined, preconfigured, or indicated by a base station.

The device can determine whether to perform LBT for a transmission, or not, based on a way to allocate resources for the transmission. The device can perform LBT for a transmission if/when a first way is utilized to allocate resources for the transmission. The device may not perform LBT for a transmission if/when a second way is utilized to allocate resources for the transmission.

The first way utilized to allocate resources can be a Downlink Control Information (DCI). The first way utilized to allocate resources can be predefined/fixed. The first way utilized to allocate resources can be configured, e.g., by a RRC configuration. The first way utilized to allocate resources could be semi-persistent scheduling. The second way utilized to allocate resources could be a DCI. The second way utilized to allocate resources could be predefined/fixed. The second way utilized to allocate resources could be configured. The second way utilized to allocate resources could be semi-persistent scheduling.

The device can perform LBT for a transmission if/when resources for the transmission is configured, e.g., by a RRC configuration. The device may not perform LBT for a transmission if/when resources for the transmission is indicated by a DCI. The device can determine how to perform LBT for a transmission or not based on a property of the transmission. Alternatively, the device can perform LBT for a transmission if/when resources for the transmission indicated by a DCI. The device may not perform LBT for a transmission if/when resources for the transmission is configured.

The device can determine whether to perform a first type of LBT or a second type of LBT for a transmission based on a property of the transmission. The device can determine how to perform LBT for a transmission, based on resource allocation of the transmission. The device can determine whether to perform a first type of LBT or a second type of LBT for a transmission based on resource allocation of the transmission. The device can determine whether to perform a first type of LBT or a second type of LBT for a transmission based on amount of resources allocated for the transmission. The device can perform a first type of LBT for a transmission if/when resources allocated for the transmission is more than a threshold. The device can perform a second type of LBT for a transmission if/when resources allocated for the transmission is less than a threshold. The device can perform a first type of LBT for a transmission if/when a first way is utilized to allocate resources for the transmission. The device can perform a second type of LBT for a transmission if/when a second way is utilized to allocate resources for the transmission. The device can perform a first type of LBT for a transmission if/when resources for the transmission is configured. The device can perform a second type of LBT for a transmission if/when resources for the transmission is indicated by a DCI. The resources could be time resources and/or frequency resources.

Exemplary methods and concepts of the present invention can determine whether and/or how to perform LBT for a transmission based on a property of a previous transmission(s). The property could be whether a previous transmission(s) was received successfully or not. The property could be number of a previous transmission(s) received successfully. The property could be a ratio of a previous transmission(s) received successfully. The property could be whether a previous LBT associated with a previous transmission(s) succeeds or not. The property could be whether a channel could be accessed for a previous transmission(s). The property could be a number of a previous successful LBT(s). The property could be a ratio of a previous successful LBT(s).

In certain embodiments, the device can determine whether to perform LBT for a transmission, or not, based on whether a previous transmission(s) was received successfully or not. The device can perform LBT for a transmission if/when a previous transmission(s) was not received successfully. The device may not perform LBT for a transmission if/when a previous transmission(s) was received successfully. The device can determine whether to perform LBT for a transmission, or not, based on number of a previous transmission(s) received successfully. The device can perform LBT for a transmission if/when number of a previous transmission(s) received successfully is less than a threshold. The device may not perform LBT for a transmission if/when a number of a previous transmission(s) received successfully is more than a threshold.

In certain embodiments, the device can determine whether to perform LBT for a transmission, or not, based on ratio of a previous transmission(s) received successfully. The device can perform LBT for a transmission if/when ratio of a previous transmission(s) received successfully is less than a threshold. The device may not perform LBT for a transmission if/when a ratio of a previous transmission(s) received successfully is more than a threshold. The device can determine whether to perform LBT for a transmission, or not, based on whether a previous LBT associated with a previous transmission(s) succeeds or not. The device can perform LBT for a transmission if/when a previous LBT associated with a previous transmission(s) fails. The device may not perform LBT for a transmission if/when a previous LBT associated with a previous transmission(s) succeeds. The device can determine whether to perform LBT for a transmission, or not, based on a number of a previous successful LBT(s). The device can perform LBT for a transmission if/when a number of a previous successful LBT(s) is less than a threshold. The device may not perform LBT for a transmission if/when a number of a previous successful LBT(s) is more than a threshold. The device can determine whether to perform LBT for a transmission, or not, based on a ratio of a previous successful LBT(s). The device can perform LBT for a transmission if/when a ratio of a previous successful LBT(s) is less than a threshold. The device may not perform LBT for a transmission if/when a ratio of a previous successful LBT(s) is more than a threshold. The threshold can be fixed, predefined or indicated by a base station.

In certain embodiments, the device can determine whether to perform a first type of LBT or a second type of LBT for a transmission based on whether a previous transmission(s) was received successfully or not. The device can determine how to perform LBT for a transmission based on whether a previous transmission(s) was received successfully or not. The device can determine whether to perform a first type of LBT or a second type of LBT for a transmission based on whether a previous transmission(s) was received successfully or not. The device can perform a first type of LBT for a transmission if/when a previous transmission(s) was received successfully. The device can perform a second type of LBT for a transmission if/when a previous transmission(s) was not received successfully. LBT associated with the previous transmission is the first type of LBT.

In certain embodiments, the device could switch LBT from the first type to the second type if previous transmission fails. The device can determine whether to perform a first type of LBT or a second type of LBT for a transmission based on a number of previous transmission(s) received successfully. The device can determine how to perform LBT for a transmission, or not, based on a number of previous transmission(s) received successfully. The device can determine whether to perform a first type of LBT or a second type of LBT for a transmission based a number of previous transmission(s) received successfully. The device can perform a first type of LBT for a transmission if/when a number of previous transmission(s) received is larger than a threshold. The device can perform a second type of LBT for a transmission if/when a number of previous transmission(s) received is larger than a threshold. LBT associated with the previous transmission is the first type of LBT.

In certain embodiments, the device could switch LBT from the first type to the second type if (too many) previous transmission fails. The device can determine whether to perform a first type of LBT or a second type of LBT for a transmission based on a ratio of previous transmission(s) received successfully. The device can determine how to perform LBT for a transmission, or not, based on a ratio of previous transmission(s) received successfully. The device can determine whether to perform a first type of LBT or a second type of LBT for a transmission based a ratio of previous transmission(s) received successfully. The device can perform a first type of LBT for a transmission if/when a ratio of previous transmission(s) received is larger than a threshold. The device can perform a second type of LBT for a transmission if/when a ratio of previous transmission(s) received is larger than a threshold. LBT associated with the previous transmission is the first type of LBT.

In certain embodiments, the device could switch LBT from the first type to the second type if (too many) previous transmission fails. The device can determine whether to perform a first type of LBT or a second type of LBT for a transmission based on whether a previous LBT associated with a previous transmission(s) succeeds or not. The device can determine how to perform LBT for a transmission, or not, based on whether a previous LBT associated with a previous transmission(s) succeeds or not. The device can determine whether to perform a first type of LBT or a second type of LBT for a transmission based on whether a previous LBT associated with a previous transmission(s) succeeds or not. The device can perform a first type of LBT for a transmission if/when a previous LBT associated with a previous transmission(s) succeeds. The device can perform a second type of LBT for a transmission if/when a previous LBT associated with a previous transmission(s) fails. The previous LBT is the first type of LBT.

In certain embodiments, the device could switch LBT from the first type to the second type if LBT fails. The device can determine whether to perform a first type of LBT or a second type of LBT for a transmission based on a number of a previous successful LBT(s). The device can determine how to perform LBT for a transmission or not based on a number of a previous successful LBT(s). The device can determine whether to perform a first type of LBT or a second type of LBT for a transmission based on a number of a previous successful LBT(s). The device can perform a first type of LBT for a transmission if/when a number of a previous successful LBT(s) is more than a threshold. The device can perform a second type of LBT for a transmission if/when a number of a previous successful LBT(s) is less than a threshold. The previous LBT is the first type of LBT.

In certain embodiments, the device could switch LBT from the first type to the second type if (too many) LBT fails. The device can determine whether to perform a first type of LBT or a second type of LBT for a transmission based on a ratio of a previous successful LBT(s). The device can determine how to perform LBT for a transmission or not based on a ratio of a previous successful LBT(s). The device can determine whether to perform a first type of LBT or a second type of LBT for a transmission based on a ratio of a previous successful LBT(s). The device can perform a first type of LBT for a transmission if/when a ratio of a previous successful LBT(s) is more than a threshold. The device can perform a second type of LBT for a transmission if/when a ratio of a previous successful LBT(s) is less than a threshold.

In certain embodiments, the first type of LBT could be omni-directional LBT. The first type of LBT could be directional LBT. The first type of LBT could be receiver-assistant LBT. The second type of LBT could be omni-directional LBT. The second type of LBT could be directional LBT. The second type of LBT could be receiver-assistant LBT. Different values for LBT parameter could be associated with different types of LBT. The first type of LBT could be associated with a first value of a LBT parameter. The second type of LBT could be associated with a second value of a LBT parameter. LBT parameter could be a (energy detection) threshold for LBT. LBT parameter could be a (contention) window size for LBT.

The device(s) referenced herein could be a base station or a User Equipment (UE).

In various embodiments, the transmission could be a Physical Downlink Shared Channel (PDSCH) transmission. The transmission could be a Physical Downlink Control Channel (PDCCH) transmission. The transmission could be SS-Block/Physical Broadcast Channel (SS/PBCH) transmission. The transmission could be a CSI Reference Signal (CSI-RS) transmission. The CSI-RS could be in a discovery burst transmission. The transmission could be a Demodulation Reference Signal (DM-RS) transmission. The transmission could be a discovery burst transmission. The transmission could be Physical Uplink Shared Channel (PUSCH) transmission. The transmission could be a Physical Uplink Control Channel (PUCCH) transmission. The transmission could be a Physical Random Access Channel (PRACH) transmission. The transmission could be a Sounding Reference Signal (SRS) transmission.

In various embodiments, the first type of LBT could be a Downlink (DL) channel access procedure. The first type of LBT could be a type 1 DL channel access procedure. The first type of LBT could be a type 2 DL channel access procedure. The first type of LBT could be a type 2A DL channel access procedure. The first type of LBT could be a type 2B DL channel access procedure. The first type of LBT could be a type 2C DL channel access procedure. The first type of LBT could be a type A multi-channel access procedure. The first type of LBT could be a type A1 multi-channel access procedure. The first type of LBT could be a type A2 multi-channel access procedure. The first type of LBT could be a type B multi-channel access procedure. The first type of LBT could be a type B1 multi-channel access procedure. The first type of LBT could be a type B2 multi-channel access procedure.

In various embodiments, the first type of LBT could be an Uplink (UL) channel access procedure. The first type of LBT could be a type 1 UL channel access procedure. The first type of LBT could be a type 2 UL channel access procedure. The first type of LBT could be a type 2A UL channel access procedure. The first type of LBT could be a type 2B UL channel access procedure. The first type of LBT could be a type 2C UL channel access procedure.

In various embodiments, the second type of LBT could be a DL channel access procedure. The second type of LBT could be a type 1 DL channel access procedure. The second type of LBT could be a type 2 DL channel access procedure. The second type of LBT could be a type 2A DL channel access procedure. The second type of LBT could be a type 2B DL channel access procedure. The second type of LBT could be a type 2C DL channel access procedure.

In various embodiments, the second type of LBT could be a type A multi-channel access procedure. The second type of LBT could be a type A1 multi-channel access procedure. The second type of LBT could be a type A2 multi-channel access procedure. The second type of LBT could be a type B multi-channel access procedure. The second type of LBT could be a type B1 multi-channel access procedure. The second type of LBT could be a type B2 multi-channel access procedure. The second type of LBT could be an UL channel access procedure. The second type of LBT could be a type 1 UL channel access procedure. The second type of LBT could be a type 2 UL channel access procedure. The second type of LBT could be a type 2A UL channel access procedure. The second type of LBT could be a type 2B UL channel access procedure. The second type of LBT could be a type 2C UL channel access procedure.

In certain embodiments, a device/UE determines whether and/or how to perform LBT for a transmission based on a property(s) of the transmission. The property could be a resource allocation for the transmission. The property could be a length or size of resource allocated for the transmission. The property could be amount of resources allocated for the transmission. The UE can perform LBT for a transmission if/when resources allocated for the transmission is more than a threshold. The UE may not perform LBT for a transmission (e.g., perform transmission directly without LBT) if/when resources allocated for the transmission is less than a threshold. The resource could be a time resource. The resource could be a frequency resource. The resource could be a time resource and a frequency resource. The threshold could be a number of Physical Resource Blocks (PRBs). The threshold could be a number of symbol(s). The threshold could be a number of slot(s). The threshold could be one slot. The threshold could be predefined, preconfigured, or indicated by a base station.

The UE can perform LBT for a transmission if/when the transmission is across more than one slot. The UE may not perform LBT for a transmission if/when the transmission is within one slot. The UE can perform a first type of LBT for a transmission if/when resources allocated for the transmission is more than a threshold. The UE can perform a second type of LBT for a transmission if/when resources allocated for the transmission is less than a threshold. The UE can perform a first type of LBT for a transmission if/when the transmission is across more than one slot. The UE can perform a second type of LBT for a transmission if/when the transmission is within one slot. The UE can perform LBT for a transmission with a first value for a LBT parameter if/when resources allocated for the transmission is more than a threshold. The UE can perform LBT for a transmission with a second value for a LBT parameter if/when resources allocated for the transmission is less than a threshold. The UE can perform LBT for a transmission with a first value for a LBT parameter if/when the transmission is across more than one slot. The UE can perform LBT for a transmission with a second value for a LBT parameter if/when the transmission is within one slot.

In certain other embodiments, a device/base station determines whether and/or how to perform LBT for a transmission based on a property(s) of the transmission. The property could be a resource allocation for the transmission. The property could be a length or size of resources allocated for the transmission. The property could be the amount of resources allocated for the transmission. The base station can perform LBT for a transmission if/when resources allocated for the transmission is more than a threshold. The base station may not perform LBT for a transmission (e.g., perform transmission directly without LBT) if/when resources allocated for the transmission is less than a threshold. The resource could be a time resource. The resource could be a frequency resource. The resource could be a time resource and a frequency resource. The threshold could be a number of PRBs. The threshold could be a number of symbol(s). The threshold could be a number of slot(s). The threshold could be one slot. The threshold could be predefined, preconfigured, or indicated by a base station.

The base station can perform LBT for a transmission if/when the transmission is across more than one slot. The base station may not perform LBT for a transmission if/when the transmission is within one slot. The base station can perform a first type of LBT for a transmission if/when resources allocated for the transmission is more than a threshold. The base station can perform a second type of LBT for a transmission if/when resources allocated for the transmission is less than a threshold. The base station can perform a first type of LBT for a transmission if/when the transmission is across more than one slot. The base station can perform a second type of LBT for a transmission if/when the transmission is within one slot. The base station can perform LBT for a transmission with a first value for a LBT parameter if/when resources allocated for the transmission is more than a threshold. The base station can perform LBT for a transmission with a second value for a LBT parameter if/when resources allocated for the transmission is less than a threshold. The base station can perform LBT for a transmission with a first value for a LBT parameter if/when the transmission is across more than one slot. The base station can perform LBT for a transmission with a second value for a LBT parameter if/when the transmission is within one slot.

In other embodiments, a device/UE determines whether and/or how to perform LBT for a transmission based on a property(s) of the transmission. The property could be a way to allocate resources for the transmission. The UE can determine whether and/or how to perform LBT for a transmission or not based on a way to allocate resources for the transmission. The UE can perform LBT for a transmission if/when a first way is utilized to allocate resources for the transmission. The UE may not perform LBT for a transmission if/when a second way is utilized to allocate resources for the transmission. The UE can perform LBT for a transmission if/when resources for the transmission is configured. The UE may not perform LBT for a transmission if/when resources for the transmission is indicated by a DCI. The UE can perform LBT for a transmission if/when resources for the transmission is indicated by a DCI. The UE may not perform LBT for a transmission if/when resources for the transmission is configured. The UE can perform a first type of LBT for a transmission if/when a first way is utilized to allocate resources for the transmission. The UE can perform a second type of LBT for a transmission if/when a second way is utilized to allocate resources for the transmission. The UE can perform a first type of LBT for a transmission if/when a resource for the transmission is configured. The UE can perform a second type of LBT for a transmission if/when a resource for the transmission is indicated by a DCI. The UE can perform LBT for a transmission with a first value for a LBT parameter if/when a first way is utilized to allocate resources for the transmission. The UE can perform LBT for a transmission with a second value for a LBT parameter if/when a second way is utilized to allocate resources for the transmission. The UE can perform LBT for a transmission with a first value for a LBT parameter if/when a resource for the transmission is configured. The UE can perform LBT for a transmission with a second value for a LBT parameter if/when resources for the transmission is indicated by a DCI.

In other embodiments, a device/base station determines whether and/or how to perform LBT for a transmission based on a property(s) of the transmission. The property could be a way to allocate resources for the transmission. The base station can determine whether and/or how to perform LBT for a transmission or not based on a way to allocate resources for the transmission. The base station can perform LBT for a transmission if/when a first way is utilized to allocate resources for the transmission. The base station may not perform LBT for a transmission if/when a second way is utilized to allocate resources for the transmission. The base station can perform LBT for a transmission if/when resources for the transmission is configured. The base station may not perform LBT for a transmission if/when resources for the transmission is indicated by a DCI. The base station can perform LBT for a transmission if/when resources for the transmission is indicated by a DCI. The base station may not perform LBT for a transmission if/when resources for the transmission is configured. The base station can perform a first type of LBT for a transmission if/when a first way is utilized to allocate resources for the transmission. The base station can perform a second type of LBT for a transmission if/when a second way is utilized to allocate resources for the transmission. The base station can perform a first type of LBT for a transmission if/when a resource for the transmission is configured. The base station can perform a second type of LBT for a transmission if/when resources for the transmission is indicated by a DCI. The UE can perform LBT for a transmission with a first value for a LBT parameter if/when a first way is utilized to allocate resources for the transmission. The base station can perform LBT for a transmission with a second value for a LBT parameter if/when a second way is utilized to allocate resources for the transmission. The base station can perform LBT for a transmission with a first value for a LBT parameter if/when a resource for the transmission is configured. The base station can perform LBT for a transmission with a second value for a LBT parameter if/when resources for the transmission is indicated by a DCI.

Figure 6:
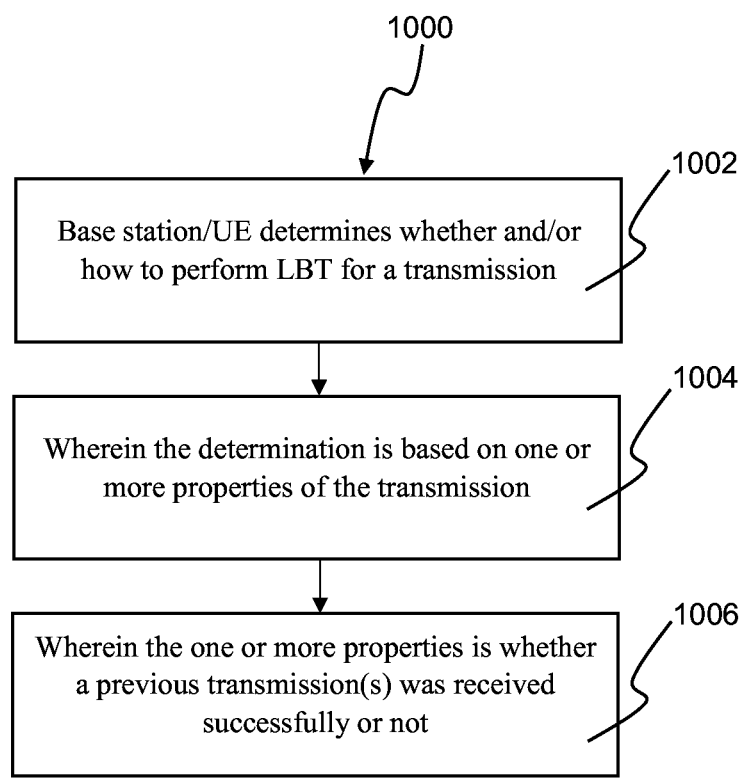
FIG. 6 is a flow diagram of a method for a base station/UE to determine whether and/or how to perform LBT for a transmission based on whether a previous transmission was received successfully or not, in accordance with embodiments of the present invention.

Referring to FIG. 6, in various embodiments/methods 1000, a base station/UE determines whether and/or how to perform LBT for a transmission (step 1002), based on a property(s) of the transmission (step 1004), wherein the property could be whether a previous transmission(s) was received successfully or not (step 1006). The base station/UE can perform LBT for a transmission if/when a previous transmission(s) was not received successfully. The base station/UE may not perform LBT for a transmission (e.g., perform transmission directly without LBT) if/when a previous transmission(s) was received successfully. The base station can perform a first type of LBT for a transmission if/when a previous transmission(s) was not received successfully. The base station/UE can perform a second type of LBT for a transmission if/when a previous transmission(s) was received successfully. The base station/UE can perform LBT for a transmission with a first value for a LBT parameter if/when a previous transmission(s) was not received successfully. The base station/UE can perform LBT for a transmission with a second value for a LBT parameter if/when a previous transmission(s) was not received successfully.

Figure 7:
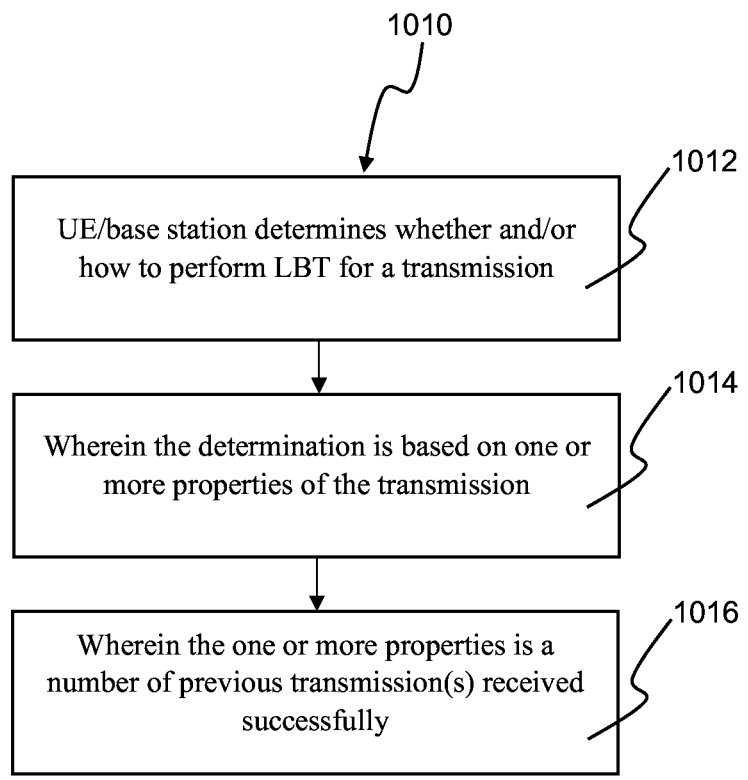
FIG. 7 is a flow diagram of a method for a UE/base station to determine whether and/or how to perform LBT for a transmission based on a number of previous transmissions received successfully, in accordance with embodiments of the present invention.

Referring to FIG. 7, in various embodiments/methods 1010, a UE/base station determines whether and/or how to perform LBT for a transmission (step 1012), based on a property(s) of the transmission (step 1014), wherein the property could be a number of previous transmission(s) received successfully (step 1016). The UE/base station can perform LBT for a transmission if/when a number of previous transmission(s) received successfully is less than a threshold. The UE/base station may not perform LBT for a transmission (e.g., perform transmission directly without LBT) if/when a number of previous transmission(s) received successfully is larger than a threshold. The UE/base station can perform a first type of LBT for a transmission if/when a number of previous transmission(s) received successfully is more than a threshold. The UE/base station can perform a second type of LBT for a transmission if/when a number of previous transmission(s) received successfully is less than a threshold. The UE/base station can perform LBT for a transmission with a first value for a LBT parameter if/when a number of previous transmission(s) received successfully is more than a threshold. The UE/base station can perform LBT for a transmission with a second value for a LBT parameter if/when a number of a previous successful LBT(s) is less than a threshold. LBT associated with the previous transmission can be the first type of LBT. LBT associated with previous transmission can use the first value.

Figure 8:
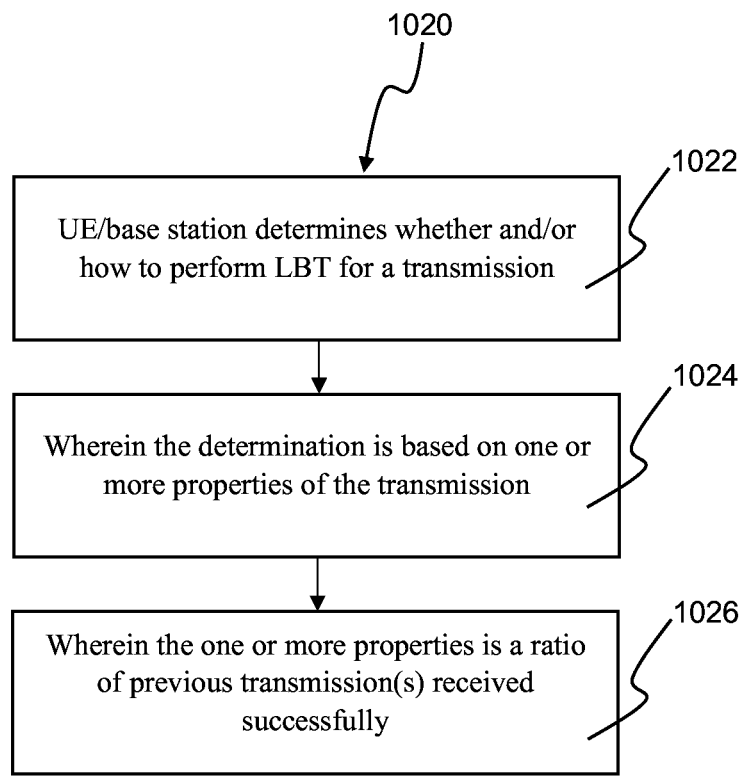
FIG. 8 is a flow diagram of a method for a UE/base station to determine whether and/or how to perform LBT for a transmission based on a ratio of previous transmission received successfully, in accordance with embodiments of the present invention.

Referring to FIG. 8, in various embodiments/methods 1020, a UE/base station determines whether and/or how to perform LBT for a transmission (step 1022), based on a property(s) of the transmission (step 1024), wherein the property could be a ratio of previous transmission(s) received successfully (step 1026). The UE/base station can perform LBT for a transmission if/when a ratio of previous transmission(s) received successfully is less than a threshold. The UE/base station may not perform LBT for a transmission (e.g., perform transmission directly without LBT) if/when a ratio of previous transmission(s) received successfully is larger than a threshold. The UE/base station can perform a first type of LBT for a transmission if/when a ratio of previous transmission(s) received successfully is more than a threshold. The UE/base station can perform a second type of LBT for a transmission if/when a ratio of previous transmission(s) received successfully is less than a threshold. The UE/base station can perform LBT for a transmission with a first value for a LBT parameter if/when a ratio of previous transmission(s) received successfully is more than a threshold. The UE/base station can perform LBT for a transmission with a second value for a LBT parameter if/when a ratio of previous transmission(s) received successfully is less than a threshold. LBT associated with the previous transmission is the first type of LBT. LBT associated with previous transmission can use the first value.

Figure 9:
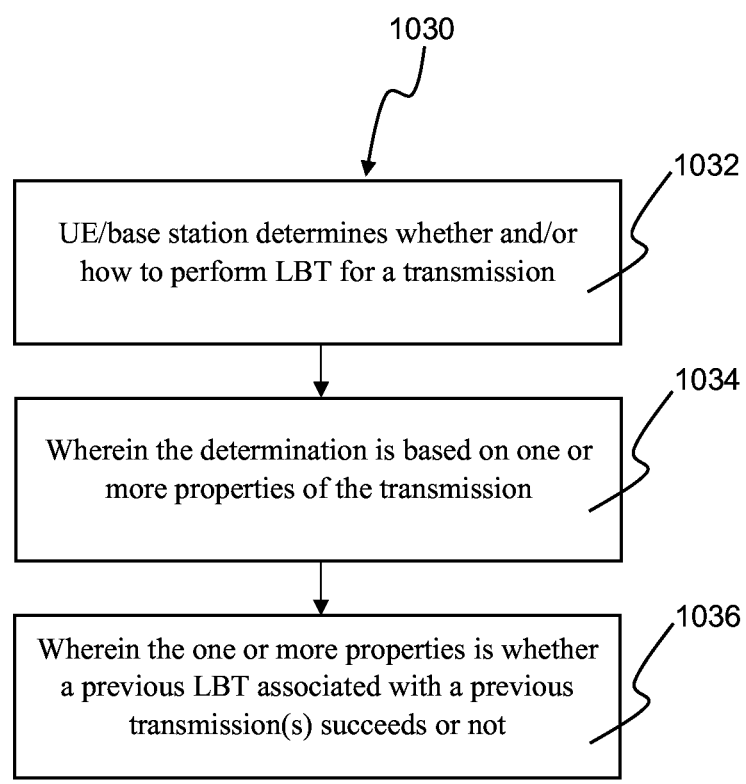
FIG. 9 is a flow diagram of a method for a UE/base station to determine whether and/or how to perform LBT for a transmission based on whether a previous LBT associated with a previous transmission succeeds or not, in accordance with embodiments of the present invention.

Referring to FIG. 9, in various embodiments/methods 1030, a UE/base station determines whether and/or how to perform LBT for a transmission (step 1032), based on a property(s) of the transmission (step 1034), wherein the property could be whether a previous LBT associated with a previous transmission(s) succeeds or not (step 1036). The UE/base station can perform LBT for a transmission if/when a previous LBT associated with a previous transmission(s) succeeds. The UE/base station may not perform LBT for a transmission (e.g., perform transmission directly without LBT) if/when a previous LBT associated with a previous transmission(s) fails. The UE/base station can perform a first type of LBT for a transmission if/when a previous LBT associated with a previous transmission(s) succeeds. The UE/base station can perform a second type of LBT for a transmission if/when a previous LBT associated with a previous transmission(s) fails. The UE/base station can perform LBT for a transmission with a first value for a LBT parameter if/when a previous LBT associated with a previous transmission(s) succeeds. The UE/base station can perform LBT for a transmission with a second value for a LBT parameter if/when a previous LBT associated with a previous transmission(s) fails. LBT associated with the previous transmission is the first type of LBT. LBT associated with previous transmission can use the first value.

Figure 10:
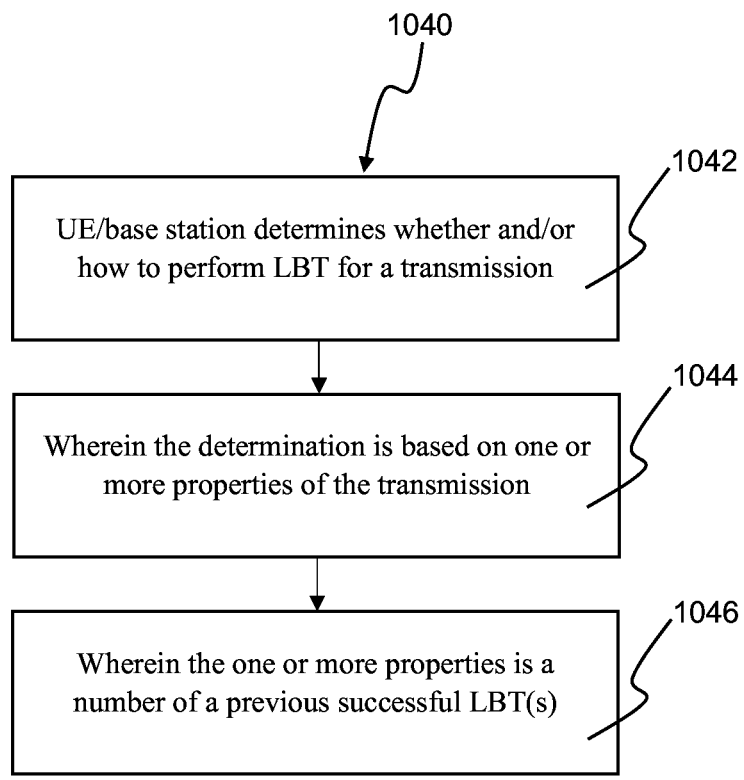
FIG. 10 is a flow diagram of a method for a UE/base station to determine whether and/or how to perform LBT for a transmission based on a number of a previous successful LBT, in accordance with embodiments of the present invention.

Referring to FIG. 10, in various embodiments/methods 1040, a UE/base station determines whether and/or how to perform LBT for a transmission (step 1042), based on a property(s) of the transmission (step 1044), wherein the property could be a number of a previous successful LBT(s) (step 1046). The UE/base station can perform LBT for a transmission if/when a number of a previous successful LBT(s) (e.g., within a window) is less than a threshold. The UE/base station may not perform LBT for a transmission (e.g., perform transmission directly without LBT) if/when a number of a previous successful LBT(s) is more than a threshold. The UE/base station can perform a first type of LBT for a transmission if/when a number of a previous successful LBT(s) (e.g., within a window) is more than a threshold. The UE/base station can perform a second type of LBT for a transmission if/when a number of a previous successful LBT(s) (e.g., within a window) is less than a threshold. The UE/base station can perform LBT for a transmission with a first value for a LBT parameter if/when a number of a previous successful LBT(s) (e.g., within a window) is more than a threshold. The UE/base station can perform LBT for a transmission with a second value for a LBT parameter if/when a number of a previous successful LBT(s) (e.g., within a window) is less than a threshold. LBT associated with the previous transmission is the first type of LBT. LBT associated with previous transmission can use the first value.

Figure 11:
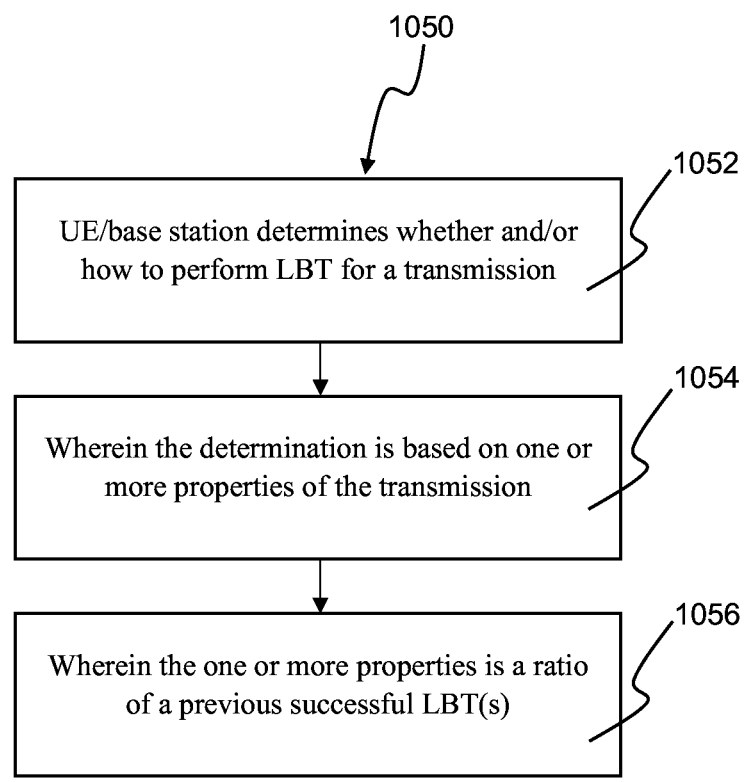
FIG. 11 is a flow diagram of a method for a UE/base station to determine whether and/or how to perform LBT for a transmission based on a ratio of a previous successful LBT, in accordance with embodiments of the present invention.

Referring to FIG. 11, in various embodiments/methods 1050, a UE/base station determines whether and/or how to perform LBT for a transmission (step 1052), based on a property(s) of the transmission (step 1054), wherein the property could be a ratio of a previous successful LBT(s) (step 1056). The UE/base station can perform LBT for a transmission if/when a ratio of a previous successful LBT(s) (e.g., within a window) is less than a threshold. The UE/base station may not perform LBT for a transmission (e.g., perform transmission directly without LBT) if/when a ratio of a previous successful LBT(s) more than a threshold. The UE can perform a first type of LBT for a transmission if/when a ratio of a previous successful LBT(s) (e.g., within a window) is more than a threshold. The UE/base station can perform a second type of LBT for a transmission if/when a ratio of a previous successful LBT(s) (e.g., within a window) is less than a threshold. The UE/base station can perform LBT for a transmission with a first value for a LBT parameter if/when a ratio of a previous successful LBT(s) (e.g., within a window) is more than a threshold. The UE/base station can perform LBT for a transmission with a second value for a LBT parameter if/when a ratio of a previous successful LBT(s) (e.g., within a window) is less than a threshold. LBT associated with the previous transmission is the first type of LBT. LBT associated with previous transmission can use the first value.

The previous transmission could be within a window. The previous LBT could be within a window.

With various embodiments of the present invention, LBT could be replaced with a channel access scheme or a channel access mechanism.

With various embodiments of the present invention, the invention describes behaviors or operations of a single serving cell unless otherwise noted.

With various embodiments of the present invention, the invention describes behaviors or operations of multiple serving cells unless otherwise noted.

With various embodiments of the present invention, the invention describes behaviors or operations of a single bandwidth part unless otherwise noted.

With various embodiments of the present invention, a base station configures multiple bandwidth parts to the UE unless otherwise noted.

With various embodiments of the present invention, a base station configures a single bandwidth part to the UE unless otherwise noted.

Figure 12:
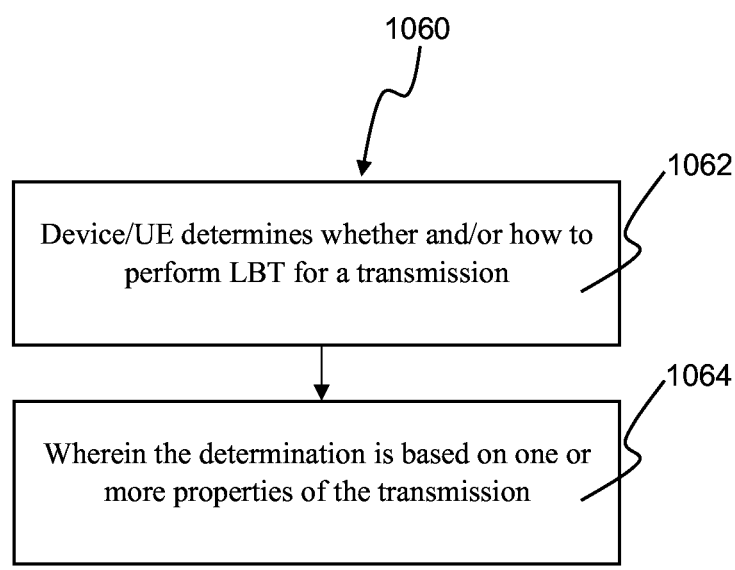
FIG. 12 is a flow diagram of a method for a UE to determine whether and/or how to perform LBT for a transmission, in accordance with embodiments of the present invention.

Referring to FIG. 12, embodiments of the present invention can include a method 1060 for a device/UE, comprising determining whether and/or how to perform LBT for a transmission (step 1062), based on a property(s) of the transmission (step 1064).

In certain embodiments, the property(s) of the transmission includes a resource allocation for the transmission.

In certain embodiments, the property(s) of the transmission includes a way to allocate the resource for the transmission.

In certain embodiments, the property(s) of the transmission includes a length or size of the resource allocated for the transmission.

In certain embodiments, the property(s) of the transmission includes amount of the resources allocated for the transmission.

In certain embodiments, LBT is performed for a transmission if the resource allocated for the transmission is more than a threshold.

In certain embodiments, LBT is not performed for a transmission if the resource allocated for the transmission is less than a threshold.

In certain embodiments, the threshold is indicated by a base station.

In certain embodiments, the threshold is predefined or fixed.

In certain embodiments, the threshold is a number of PRB(s).

In certain embodiments, the threshold is a number of symbol(s).

In certain embodiments, the threshold is a number of slot(s).

In certain embodiments, the threshold is one slot.

In certain embodiments, LBT is performed for a transmission if a first way is utilized to allocate resources for the transmission.

In certain embodiments, LBT is not performed for a transmission if a second way is utilized to allocate resources for the transmission.

In certain embodiments, LBT is performed for a transmission if a resource for the transmission is configured.

In certain embodiments, LBT is not performed for a transmission if resources for the transmission is indicated by a DCI.

Referring back to FIGS. 3 and 4, in one or more embodiments of a device/UE 300, the device/UE 300 includes program code 312 stored in memory 310. The CPU 308 could execute program code 312 to: (i) determine whether and/or how to perform LBT for a transmission; and (ii) wherein the determination is based on one or more properties of the transmission. Moreover, the CPU 308 can execute the program code 312 to perform all of the described actions, steps, and methods described above, below, or otherwise herein.

Figure 13:
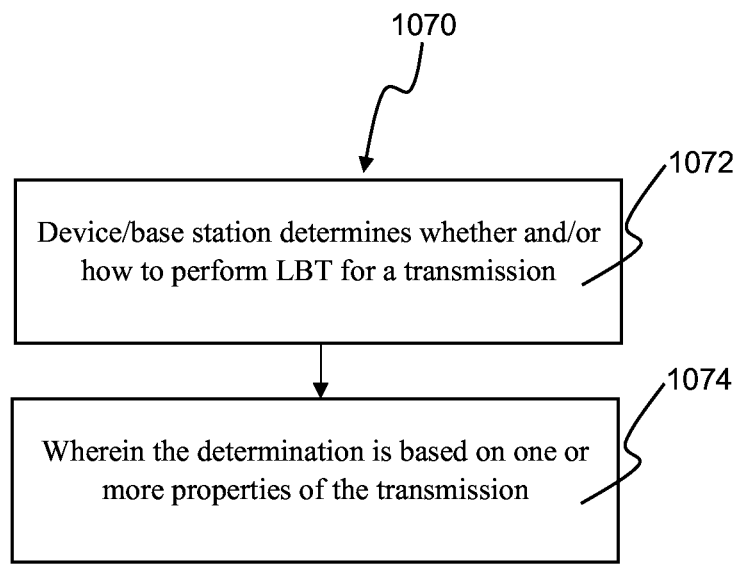
FIG. 13 is a flow diagram of a method for a base station to determine whether and/or how to perform LBT for a transmission, in accordance with embodiments of the present invention.

Referring to FIG. 13, embodiments of the present invention can include a method 1070 for a device/base station, comprising determining whether and/or how to perform LBT for a transmission (step 1072), based on a property(s) of the transmission (step 1074).

In certain embodiments, the property(s) of the transmission includes a resource allocation for the transmission.

In certain embodiments, the property(s) of the transmission includes a way to allocate resources for the transmission.

In certain embodiments, the property(s) of the transmission includes a length or size of resources allocated for the transmission.

In certain embodiments, the property(s) of the transmission includes amount of resources allocated for the transmission.

In certain embodiments, LBT is performed for a transmission if resources allocated for the transmission is more than a threshold.

In certain embodiments, LBT is not performed for a transmission if resources allocated for the transmission is less than a threshold.

In certain embodiments, the threshold is indicated by a base station.

In certain embodiments, the threshold is predefined or fixed.

In certain embodiments, the threshold is a number of PRB(s).

In certain embodiments, the threshold is a number of symbol(s).

In certain embodiments, the threshold is a number of slot(s).

In certain embodiments, the threshold is one slot.

In certain embodiments, LBT is performed for a transmission if a first way is utilized to allocate resources for the transmission.

In certain embodiments, LBT is not performed for a transmission if a second way is utilized to allocate resources for the transmission.

In certain embodiments, LBT is performed for a transmission if a resource for the transmission is configured.

In certain embodiments, LBT is not performed for a transmission if resources for the transmission is indicated by a DCI.

Referring back to FIGS. 3 and 4, in one or more embodiments of a device/base station 300, the device/base station 300 includes program code 312 stored in memory 310. The CPU 308 could execute program code 312 to: (i) determine whether and/or how to perform LBT for a transmission; and (ii) wherein the determination is based on a property(s) of the transmission. Moreover, the CPU 308 can execute the program code 312 to perform all of the described actions, steps, and methods described above, below, or otherwise herein.

Figure 14:
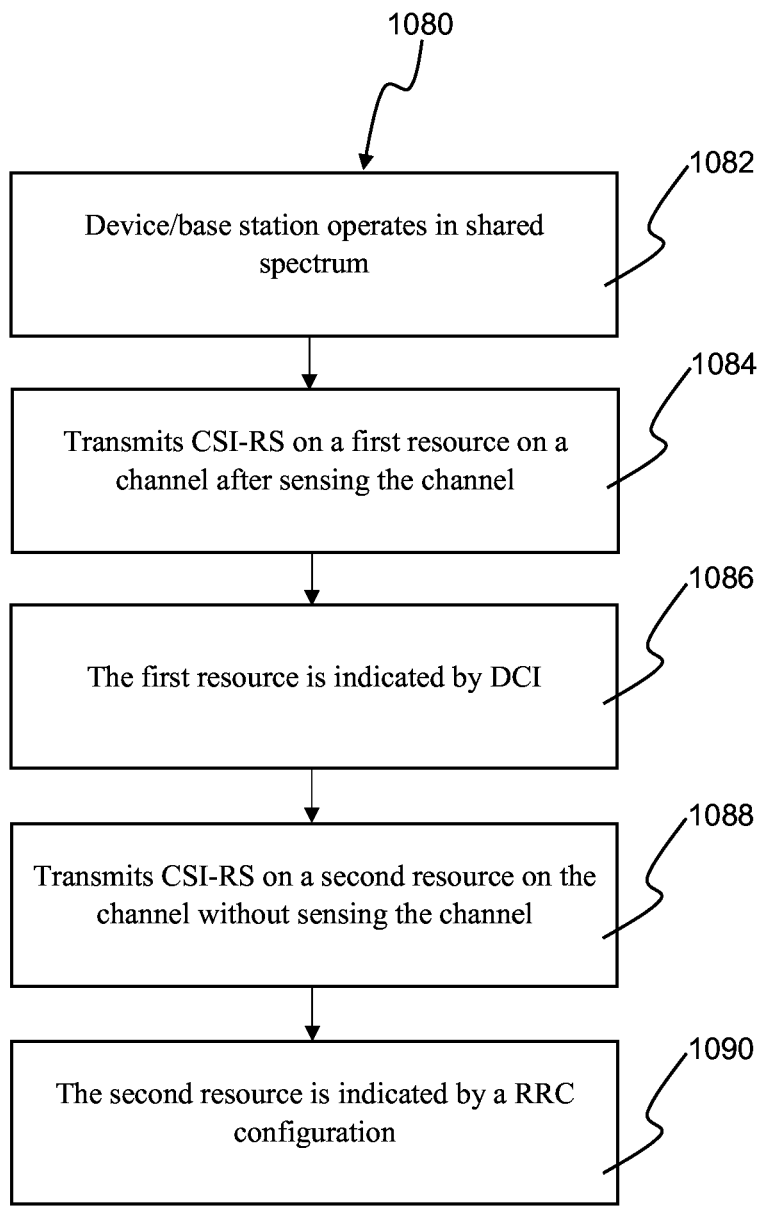
FIG. 14 is a flow diagram of a method for a base station operating in a shared spectrum to transmit CSI-RS on a first resource on a channel after sensing the channel, in accordance with embodiments of the present invention.

Referring to FIG. 14, embodiments of the present invention can include a method 1080 for a device/base station, comprising operating in a shared spectrum, at step 1082. The base station transmits CSI-RS on a first resource on a channel after sensing the channel (step 1084), wherein the first resource is indicated by DCI (step 1086). The base station further transmits CSI-RS on a second resource on the channel without sensing the channel (step 1088), wherein the second resource is indicated by a RRC configuration (step 1090).

In certain embodiments, the CSI-RS on the second resource is for discovery burst.

In certain embodiments, the base station transmits CSI-RS on the channel after sensing the channel if the CSI-RS is transmitted on the first resource.

In certain embodiments, the base station transmits CSI-RS on the channel without sensing the channel if the CSI-RS is transmitted on the second resource for discovery burst.

In certain embodiments, the base station does not perform LBT for CSI-RS transmission on the second resource.

In certain embodiments, the base station performs LBT for CSI-RS transmission on the first resource.

In certain embodiments, the first resource and the second resource are on a serving cell.

Referring back to FIGS. 3 and 4, in one or more embodiments of a device/base station 300, the device/base station 300 includes program code 312 stored in memory 310. The CPU 308 could execute program code 312 to (i) operate in a shared spectrum; (ii) transmit CSI-RS on a first resource on a channel after sensing the channel; (iii) wherein the first resource is indicated by DCI; (iv) transmit CSI-RS on a second resource on the channel without sensing the channel; and (v) wherein the second resource is indicated by a RRC configuration. Moreover, the CPU 308 can execute the program code 312 to perform all of the described actions, steps, and methods described above, below, or otherwise herein.

Figure 15:
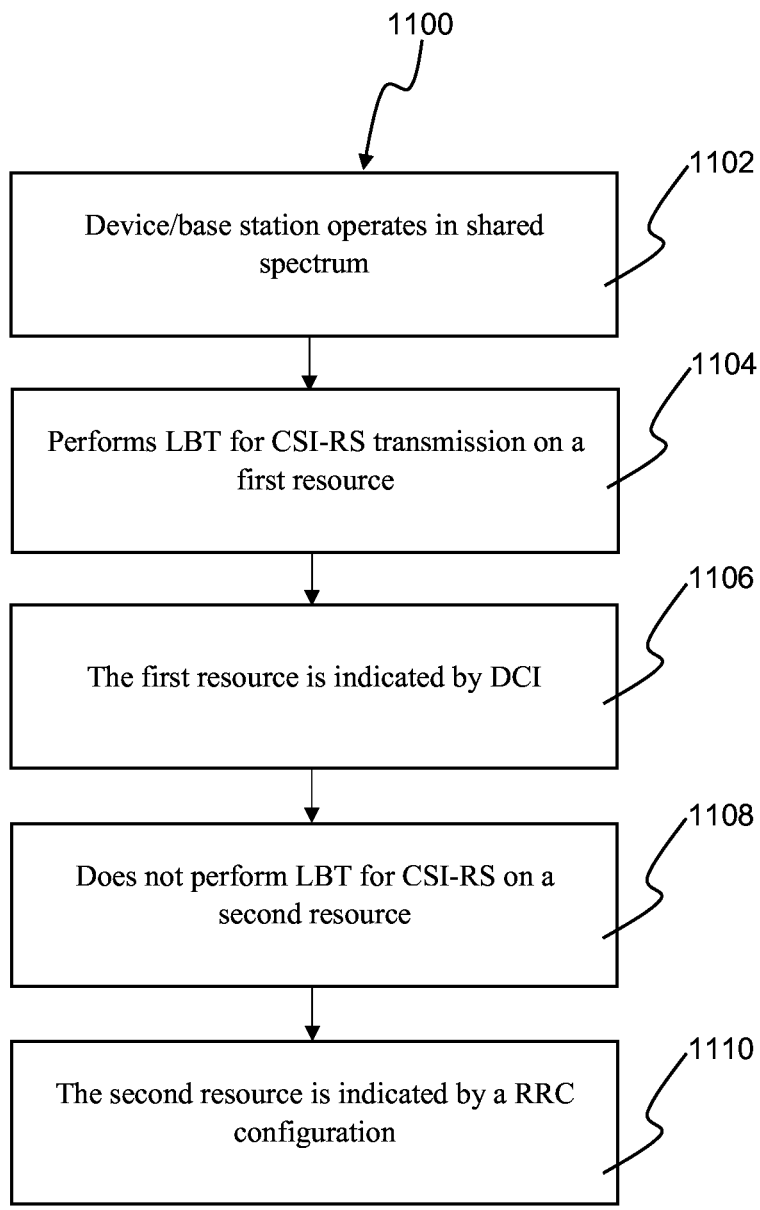
FIG. 15 is a flow diagram of a method for a base station operating in a shared spectrum to perform LBT for CSI-RS transmission on a first resource, in accordance with embodiments of the present invention.

Referring to FIG. 15, embodiments of the present invention include a method 1100 for a device/base station, comprising operating in a shared spectrum, at step 1102. The base station performs LBT for CSI-RS transmission on a first resource (step 1104), wherein the first resource is indicated by DCI (step 1106). The base station does not perform LBT for CSI-RS on a second resource (step 1108), wherein the second resource is indicated by a RRC configuration (step 1110).

In certain embodiments, the CSI-RS on the second resource is for discovery burst.

In certain embodiments, the base station performs LBT for a CSI-RS if the CSI-RS is transmitted on the first resource.

In certain embodiments, the base station does not perform LBT for a CSI-RS if the CSI-RS is transmitted on the second resource for discovery burst.

In certain embodiments, the first resource and the second resource are on a serving cell.

Referring back to FIGS. 3 and 4, in one or more embodiments of a device/base station 300, the device/base station 300 includes program code 312 stored in memory 310. The CPU 308 could execute program code 312 to (i) operate in a shared spectrum; (ii) perform LBT for CSI-RS transmission on a first resource; (iii) wherein the first resource is indicated by DCI; (iv) do not perform LBT for CSI-RS on a second resource; and (v) wherein the second resource is indicated by a RRC configuration. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a base station operating in a shared spectrum, comprising:

transmitting Channel State Information Reference Signal (CSI-RS), not for discovery burst, on a first resource on a channel after sensing the channel upon determining the CSI-RS is not for discovery burst on the first resource that is indicated by Downlink Control Information (DCI), and wherein the CSI-RS and the DCI are on a same cell; and transmitting CSI-RS for discovery burst on a second resource on the channel without sensing the channel upon determining the CSI-RS is for discovery burst on the second resource that is indicated by a Radio Resource Control (RRC) configuration for discovery burst.

2. The method of claim 1, further comprising transmitting CSI-RS on the channel after sensing the channel if the CSI-RS is transmitted on the first resource.

3. The method of claim 1, further comprising transmitting CSI-RS on the channel without sensing the channel if the CSI-RS is transmitted on the second resource for discovery burst.

4. The method of claim 1, further comprising not performing Listen-Before-Talk (LBT) for CSI-RS transmission on the second resource.

5. The method of claim 1, further comprising performing LBT for CSI-RS transmission on the first resource.

6. The method of claim 1, wherein the first resource and the second resource are on a serving cell.

7. A method for a base station operating in a shared spectrum, comprising:
   performing Listen-Before-Talk (LBT) for Channel State Information Reference Signal (CSI-RS) transmission, not for discovery burst, on a first resource upon determining the CSI-RS is not for discovery burst on the first resource that is indicated by Downlink Control Information (DCI), and wherein the CSI-RS and the DCI are on a same cell; and
   not performing LBT for CSI-RS for discovery burst on a second resource upon determining the CSI-RS is for discovery burst on the second resource that is indicated by a Radio Resource Control (RRC) configuration for discovery burst.

8. The method of claim 7, further comprising performing LBT for a CSI-RS if the CSI-RS is transmitted on the first resource.

9. The method of claim 7, further comprising not performing LBT for a CSI-RS if the CSI-RS is transmitted on the second resource for discovery burst.

10. The method of claim 7, wherein the first resource and the second resource are on a serving cell.

11. A base station configured to operate in a shared spectrum, comprising:
    a memory; and
    a processor operatively coupled with the memory, wherein the processor is configured to execute program code to:
       transmit a Channel State Information Reference Signal (CSI-RS), not for discovery burst, on a first resource on a channel after sensing the channel upon determining the CSI-RS is not for discovery burst on the first resource that is indicated by Downlink Control Information (DCI), and wherein the CSI-RS and the DCI are on a same cell; and
       transmit a CSI-RS for discovery burst on a second resource on the channel without sensing the channel, wherein upon determining the CSI-RS is for discovery burst on the second resource that is indicated by a Radio Resource Control (RRC) configuration for discovery burst.

12. The base station of claim 11, wherein the processor is further configured to execute program code to transmit the CSI-RS on the channel after sensing the channel if the CSI-RS is transmitted on the first resource.

13. The base station of claim 11, wherein the processor is further configured to execute program code to transmit CSI-RS on the channel without sensing the channel if the CSI-RS is transmitted on the second resource for discovery burst.

14. The base station of claim 11, wherein the processor is further configured to execute program code to not perform Listen-Before-Talk (LBT) for CSI-RS transmission on the second resource.

15. The base station of claim 11, wherein the processor is further configured to execute program code to perform LBT for CSI-RS transmission on the first resource.

16. The base station of claim 11, wherein the first resource or the second resource are on a serving cell.

17. The base station of claim 11, wherein the channel is a carrier or a part of a carrier consisting of a contiguous set of resource blocks (RBs).

* * * * *